United States Patent
Oka et al.

(10) Patent No.: US 9,335,472 B2
(45) Date of Patent: May 10, 2016

(54) PLANAR OPTICAL WAVEGUIDE DEVICE AND DP-QPSK MODULATOR

(71) Applicant: FUJIKURA LTD., Koto-ku, Tokyo (JP)

(72) Inventors: Akira Oka, Sakura (JP); Kensuke Ogawa, Sakura (JP); Kazuhiro Goi, Sakura (JP); Hiroyuki Kusaka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/509,126

(22) Filed: Oct. 8, 2014

(65) Prior Publication Data

US 2015/0104128 A1    Apr. 16, 2015

(30) Foreign Application Priority Data

Oct. 15, 2013    (JP) ................... 2013-214792

(51) Int. Cl.
| | |
|---|---|
| *G02F 1/035* | (2006.01) |
| *G02B 6/122* | (2006.01) |
| *G02B 6/125* | (2006.01) |

(Continued)

(52) U.S. Cl.
CPC .............. *G02B 6/1228* (2013.01); *G02B 6/125* (2013.01); *G02B 6/126* (2013.01); *G02B 6/14* (2013.01)

(58) Field of Classification Search
CPC . G02F 1/225; G02F 1/2255; G02F 2001/212; G02F 1/025; G02F 1/2257; G02F 1/035
USPC .................... 385/1, 2, 3, 4, 9, 15, 39, 43, 123
See application file for complete search history.

(56) References Cited

U.S. PATENT DOCUMENTS

| | | | |
|---|---|---|---|
| 6,400,856 B1 * | 6/2002 | Chin ................ | G02B 6/12007 385/11 |
| 2013/0216175 A1 | 8/2013 | Onishi | |

(Continued)

FOREIGN PATENT DOCUMENTS

| | | |
|---|---|---|
| JP | 2000-121857 A | 4/2000 |
| JP | 2002-71984 A | 3/2002 |
| JP | 2003-329986 A | 11/2003 |

(Continued)

OTHER PUBLICATIONS

Communication dated Jan. 6, 2015 from the Japanese Patent Office in counterpart application No. 2013-214792.

(Continued)

*Primary Examiner* — Jennifer Doan
(74) *Attorney, Agent, or Firm* — Sughrue Mion, PLLC

(57) ABSTRACT

A planar optical waveguide device, includes: two input portions that are waveguides that have the same width, are parallel to each other, and have rectangular cross-sections; a wide portion that is a linear waveguide and is connected after the two input portions; a tapered portion that is connected after the wide portion and that is a multi-mode waveguide which has a tapered shape having a width decreasing gradually and through which at least TE1 propagates; and an output portion that is connected after the tapered portion and that is a multi-mode waveguide which has a rectangular cross-section and through which at least TE1 propagates. The planar optical waveguide device forms a high-order mode conversion combining element that outputs the TE0, which is input to the two input portions, as the TE1 from the output portion.

14 Claims, 20 Drawing Sheets

(51) Int. Cl.
*G02B 6/126* (2006.01)
*G02B 6/14* (2006.01)

(56) References Cited

U.S. PATENT DOCUMENTS

| | | | |
|---|---|---|---|
| 2013/0236136 A1 | 9/2013 | Nara et al. | |
| 2015/0293299 A1* | 10/2015 | Xu | G02B 6/1228 385/28 |

FOREIGN PATENT DOCUMENTS

| | | | |
|---|---|---|---|
| JP | 2006-91785 | A | 4/2006 |
| JP | 2006-235380 | A | 9/2006 |
| JP | 2009-222790 | A | 10/2009 |
| JP | 2013-41146 | A | 2/2013 |
| JP | 2013-171186 | A | 9/2013 |
| WO | 2012/132907 | A1 | 10/2012 |

OTHER PUBLICATIONS

Machine Translation of JP 2013-171186 of record. (Oct. 8, 2014).
Machine Translation of WO 2012/132907 of record. (Oct. 8, 2014).
Machine Translation of JP 2009-222790 of record. (Oct. 8, 2014).
Machine Translation of JP 2013-041146 of record. (Oct. 8, 2014).
Machine Translation of JP 2003-329986 of record. (Oct. 8, 2014).
Machine Translation of JP 2006-235380 of record. (Oct. 8, 2014).
Machine Translation of JP 2006-091785 of record. (Oct. 8, 2014).
Machine Translation of JP 2002-071984 of record. (Oct. 8, 2014).
Machine Translation of JP 2000-121857 of record. (Oct. 8, 2014).
Japanese Office Action for JP 2013-214792 dated Aug. 12, 2014.
Po Dong et al., "112-Gb/s Monolithic PDM-QPSK Modulator in Silicon", European Conference and Exhibition on Optical Communication 2012, p. Th.3.B.1, vol. 1.
Hiroshi Fukuda et al., "Ultrasmall polarization splitter based on silicon wire waveguides", Optics Express, Dec. 11, 2006, 8 pgs., vol. 14, No. 25.
Yuji Matsuura et al., "Low loss Y-junction for high reproducibility", IEICE, Apr. 1994, C-330, pp. 4-327.
Yunhong Ding et al., "Wide-band Polarization Splitter and Rotator with Large Fabrication Tolerance and Simple Fabrication Process", OFC/NFOEC Technical Digest, 2013, OTh4I.2, 3 pgs.
K. Mertens et al., "First Realized Polarization Converter Based on Hybrid Supermodes", IEEE Photonics Technology Letters, Mar. 1998, pp. 388-390, vol. 10, No. 3.

* cited by examiner

PLANAR OPTICAL WAVEGUIDE DEVICE AND DP-QPSK MODULATOR

BACKGROUND OF THE INVENTION

1. Field of the Invention

The present invention relates to a device that performs combining of light and mode conversion simultaneously for a planar optical waveguide device and a DP-QPSK modulator used in optical fiber communication.

Priority is claimed on Japanese Patent Application No. 2013-214792, filed on Oct. 15, 2013, the content of which is incorporated herein by reference.

2. Description of Related Art

Currently, the amount of information transmitted in optical communication has been increasing. In order to respond to such an increase in the amount of information, measures have been taken to increase the signal speed, an increase in the number of channels due to wavelength multiplexing communication, and the like. In particular, in digital coherent transmission technology of the next generation 100 Gbps (gigabit per second) for high-speed information communication, in order to double the amount of information per unit time, a polarization multiplexing scheme for carrying information in two polarized waves having electric fields perpendicular to each other is used. However, in modulation schemes for high-speed communication including the polarization multiplexing scheme, the structure of optical circuit components that form an optical modulator is complicated. For this reason, problems, such as a device size increase and a cost increase, occur. In order to solve such problems, an optical modulator having a planar optical waveguide using silicon, which is advantageous in terms of easy processing, size reduction by integration, and cost reduction by mass production, has been studied.

However, the polarization multiplexing in the planar optical waveguide has the following problems. In general, the planar optical waveguide has a shape in which the width direction parallel to the substrate and the height direction perpendicular to the substrate are asymmetric. For this reason, in two types of polarization modes of a mode in which an electric field component in the width direction is a main component (hereinafter, referred to as a TE mode) and a mode in which an electric field component in the height direction is a main component (hereinafter, referred to as a TM mode), the characteristics, such as an effective refractive index, are different. Among these modes, a fundamental TE mode (TE0) and a fundamental TM mode (TM0) are used in many cases. Here, TE0 refers to a mode having the largest effective refractive index of the TE modes. In addition, TM0 refers to a mode having the largest effective refractive index of the TM modes. It is difficult to perform an optical modulation operation for these modes having different characteristics with a single planar optical waveguide device. Accordingly, planar optical waveguide devices optimized for the modes are required. However, this requires a lot of effort in terms of the development of the planar optical waveguide devices.

As a method for solving this problem, a method can be mentioned in which TE0 is used as light incident on the planar optical waveguide device optimized for the desired TE0 and the output is polarization-converted to TM0. The polarization conversion herein indicates a conversion from TE0 to TM0. In order to perform the operation described above, a planar optical waveguide device for performing polarization conversion on the substrate is required.

As a technique for performing such polarization conversion on the substrate, an optical waveguide device has been proposed in which TE0 is converted to TE1 in a combining portion that outputs one high-order TE mode (TE1) for the input of one or two TE0 (hereinafter, an element including such a portion is referred to as a high-order mode conversion combining element) and then the TE1 is converted to TM0.

Here, TE1 indicates a TE mode having the second largest effective refractive index. As the related art, Non-patent document 1 (K. Mertens, et al., "First Realized Polarization Converter Based on Hybrid Supermodes", IEEE Photonics technology letters, Vol. 10, No. 3 (1998)), Non-patent document 2 (Yunhong Ding, et al., "Wide-band Polarization Splitter and Rotator with Large Fabrication Tolerance and Simple Fabrication Process", OFC/NFOEC Technical Digest, OTh4I.2 (2013)), and Non-patent document 3 (Yuji Matsuura, et al., "Low Loss of New Y-branch Structure Element", 1994 Spring Meeting of Institute of Electronics, Information and Communication Engineers of Japan, C-330, April, 1994) can be mentioned.

As shown in FIG. 2A, the devices disclosed in Non-patent document 1 and Non-patent document 2 have a structure in which TM0 is used as an input, TM0 is input to a high-order polarization conversion element 21 that converts TM0 to TE1, and a branch portion 22 that divides TE1 into two TE0 is provided after the high-order polarization conversion element 21 (refer to FIG. 4(b) in Non-patent document 1 and FIGS. 1A to 1C in Non-patent document 2. Attention is paid to the reverse process in the invention. In this case, as shown in FIG. 2B, the structure in the related art is the same as a structure in which TE0 input to one or both of two input ports of a combining portion 22 is output as TE1 (that is, a high-order mode conversion combining element) and then TE1 is converted to TM0 after passing through the high-order polarization conversion element 21 (here, the branch portion is referred to as a combining portion since attention is paid to the reverse process; the same hereinbelow). That is, by using these elements, it is possible to perform polarization conversion and combining simultaneously.

In the devices disclosed in Non-patent document 1 and Non-patent document 2, it is thought that a Y-branch element is used as a high-order mode conversion combining element. This is determined from the diagrams or the waveguide size in the documents, even though Y-branch is not mentioned in the Non-patent document 1 and the Non-patent document 2.

A Y-branch element having a reduced manufacturing error by providing a gap between input portions is disclosed in Non-patent document 3. However, both an input portion and an output portion are single-mode waveguides through which only TE0 passes, and conversion to TE1 is not intended originally in the Y-branch element.

SUMMARY OF THE INVENTION

In the devices disclosed in Non-patent document 1 and Non-patent document 2, a Y-branch structure is used as a high-order mode conversion combining element. As shown in FIG. 3A, in the Y-branch structure, a combining portion 103 with low loss is formed by bringing two waveguides 101 and 102 of input portions close to each other continuously and slowly. In such a structure, in order to form an intersection of the two waveguides of the input portions, a process capable of forming a very fine structure is required. However, since it is difficult to accurately form such a structure in practice, the intersection of the two waveguides becomes round as indicated by reference numeral 104 in FIG. 3B. In the structure shown in FIG. 3B, continuity in the longitudinal direction of the waveguide is lost at the boundary between the rounded intersection 104 and the two waveguides 101 and 102 having a fixed width. Since the mode changes abruptly before and after the boundary, the loss is increased. In particular, when the size of the waveguide is an order of several hundred nanometers as a silicon wire waveguide, the manufacturing problem described above becomes more serious.

The invention has been made in view of the above-described situation, and it is an object of the invention to provide a planar optical waveguide device including a high-order mode conversion combining element that can be easily manufactured and can reduce the loss.

In order to solve the aforementioned problem, according to a first aspect of the invention, a planar optical waveguide device includes: two input portions that are waveguides that have the same width, are parallel to each other, and have rectangular cross-sections; a wide portion that is a linear waveguide and is connected after the two input portions; a tapered portion that is connected after the wide portion and that is a multi-mode waveguide which has a tapered shape having a width decreasing gradually and through which at least TE1 propagates; and an output portion that is connected after the tapered portion and that is a multi-mode waveguide which has a rectangular cross-section and through which at least TE1 propagates. In addition, the planar optical waveguide device forms a high-order mode conversion combining element that outputs the TE0, which is input to the two input portions, as the TE1 from the output portion. Assuming that a distance between the two input portions in a width direction of the two input portions is gap, a width of each of the two input portions is Wa, and a waveguide width of the wide portion is Wb, a relationship of Wb>Wa×2+gap is satisfied, and a center of the two input portions in the width direction of the two input portions matches a center of the wide portion in a width direction of the wide portion.

The planar optical waveguide device according to the aspect of the invention may further include a bent waveguide that is connected before one or both of the two input portions.

The planar optical waveguide device according to the aspect of the invention may further include a tapered waveguide that is connected before the two input portions and changes a width of a waveguide.

The planar optical waveguide device according to the aspect of the invention may further include a tapered waveguide that is connected after the output portion and changes a width of a waveguide.

The planar optical waveguide device according to the aspect of the invention may further include a high-order mode splitter that is connected after the output portion and extracts TE1.

The planar optical waveguide device according to the aspect of the invention may further include a high-order polarization conversion element that is connected after the high-order mode splitter and converts TE1 to TM0.

The planar optical waveguide device according to the aspect of the invention may further include a high-order polarization conversion element that is connected after the output portion and converts TE1 to TM0.

The planar optical waveguide device according to the aspect of the invention may further include a polarization beam splitter that is connected after the high-order polarization conversion element and extracts TM0.

The planar optical waveguide device according to the aspect of the invention may further include a polarization beam splitter that is connected after the high-order polarization conversion element and extracts TM0.

A waveguide that forms the high-order mode conversion combining element may be formed by a core and claddings surrounding the core, and the claddings may be formed of the same material.

In a waveguide that forms the high-order mode conversion combining element, a height of the core may be 220 nm, the core may be formed of Si, the cladding may be formed of $SiO_2$, and the Wa may satisfy 400 nm≤Wa≤800 nm and the gap may satisfy 100 nm≤gap≤500 nm. Assuming that Wc=(Wb−(Wa×2+gap))/2 and Wd=(−0.0000000008350862×$gap^2$−0.000000436986×gap+0.0008631515625)×$Wa^1$+(0.0000016652002737×$gap^2$+0.000208004578×gap−1.2672957688375)×Wa+(−0.00069425946204×$gap^2$+0.670233759496504×gap+462.994458236249), 0<Wc<Wd may be satisfied.

According to a second aspect of the invention, a DP-QPSK modulator includes the planar optical waveguide device according to the first aspect.

According to the aspect of the invention, it is possible to provide a planar optical waveguide device including a high-order mode conversion combining element that can be easily manufactured and can reduce the loss.

DETAILED DESCRIPTION OF THE INVENTION

Hereinafter, the invention will be described through preferred embodiments with reference to the accompanying diagrams.

Figure 1:
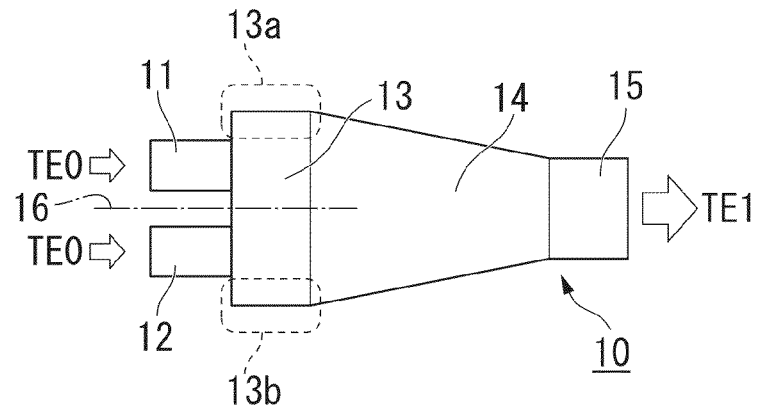
FIG. 1 is a schematic plan view showing an example of a high-order mode conversion combining element of the invention.
Figure 2A:
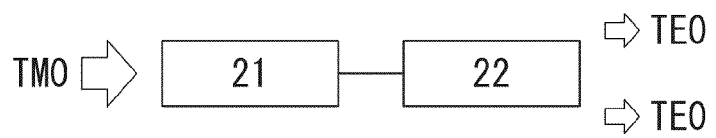
FIG. 2A is a model diagram showing a structure including a high-order polarization conversion element and a branch portion.
Figure 2B:
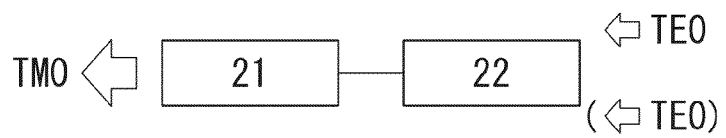
FIG. 2B is a model diagram showing a structure including a combining portion and a high-order polarization conversion element.

As shown in FIG. 1, a high-order mode conversion combining element 10 according to the present embodiment is configured to include two input portions 11 and 12, a wide portion 13 (hereinafter, referred to as a mode conversion portion 13), a tapered portion 14, and an output portion 15. The input portions 11 and 12 are waveguides that form two input parts having the same width. The input portions 11 and 12 are provided with a gap interposed therebetween, and the high-order mode conversion combining element 10 has the same structure as a Y-branch in which the bases of the input portions 11 and 12 are flat. The two input portions 11 and 12 are connected to the mode conversion portion 13, which is a linear waveguide, so as to be axisymmetric in a width direction. In addition, the mode conversion portion 13 is connected after the two input portions 11 and 12, and has protruding portions 13a and 13b that are provided at both ends in the width direction and have the same width.

The tapered portion 14 is a tapered waveguide having a width that changes for connection with another waveguide and is connected after the mode conversion portion 13. The output portion 15 has a rectangular shape connected after the tapered portion 14, and forms a multi-mode linear waveguide in which there is a waveguide mode of at least TE1. The tapered portion 14 and the output portion 15 are not necessarily required for conversion from TE0 to TE1. On the other hand, when actual use is taken into consideration, it is preferable to provide the tapered portion 14, which can convert the waveguide width of the mode conversion portion 13 to an appropriate width, and the output portion 15, which is connected after the tapered portion 14 and through which the generated TE1 can propagate. The high-order mode conversion combining element having the tapered portion 14 and the output portion 15 forms a multi-mode waveguide through which at least TE1 propagates.

First Embodiment

Basic Embodiment as a High-Order Mode Conversion Combining Element

In the high-order mode conversion combining element 10 of the first embodiment, assuming that a distance between the two input portions 11 and 12 is gap (nm), the width of each of the two input portions 11 and 12 is Wa (nm), and the waveguide width of the mode conversion portion 13 is Wb (nm), the relationship of Wb>Wa×2+gap is satisfied.

As shown in a center line 16 of FIG. 1, the center of the two input portions 11 and 12 in the width direction match the center of the mode conversion portion 13 in the width direction.

FIGS. 4A to 4G illustrate electric field distribution (Ex component) when light is guided through each structure and an Ex component when Y=0 μm. In all examples, the height of the waveguide is 220 nm, the cladding material is $SiO_2$ (refractive index 1.44), the core material is Si (refractive index 3.48), and the wavelength of light is 1550 nm. X indicates a width direction, and Y indicates the coordinates in the height direction (the same hereinbelow). Rectangles in FIGS. 4A to 4C indicate core shapes.

Figure 4A:
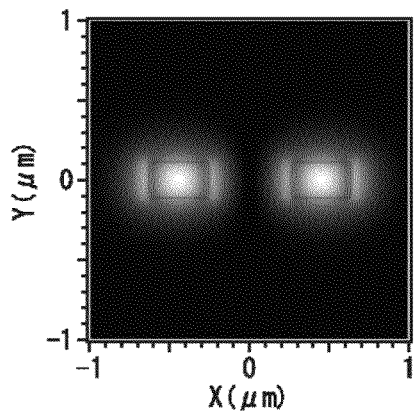
FIG. 4A is a simulation result showing the electric field distribution (Ex component) of TE0 in two input portions.
Figure 4D:
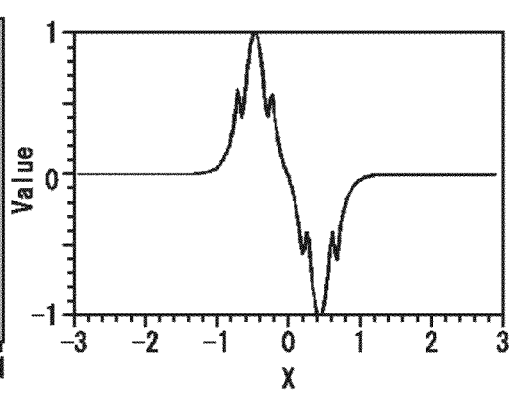
FIG. 4D is a graph showing an Ex component when Y=0 µm in FIG. 4A.

FIG. 4A shows the electric field distribution (Ex component) of TE0 in two input portions, and FIG. 4D shows an Ex component when Y=0 μm in FIG. 4A.

Figure 4B:
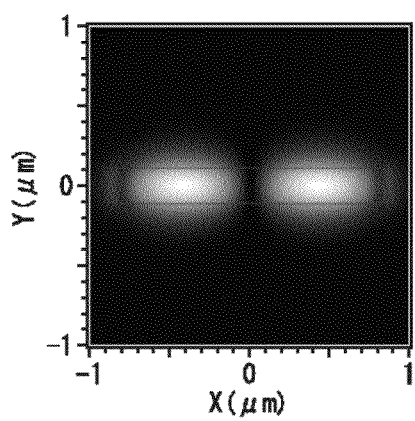
FIG. 4B is a simulation result showing the electric field distribution (Ex component) of TE1 in a mode conversion portion in which protruding portions having the same width are provided on both sides in the width direction.
Figure 4E:
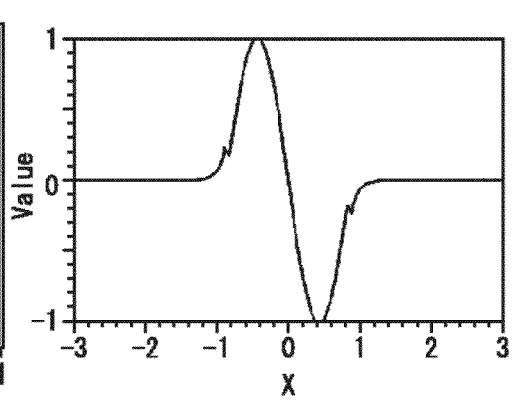
FIG. 4E is a graph showing an Ex component when Y=0 µm in FIG. 4B.

FIG. 4B shows the electric field distribution (Ex component) of TE1 in a mode conversion portion in which the protruding portions 13a and 13b having the same width are provided on both sides in the width direction, and FIG. 4E shows an Ex component when Y=0 μm in FIG. 4B.

Figure 4C:
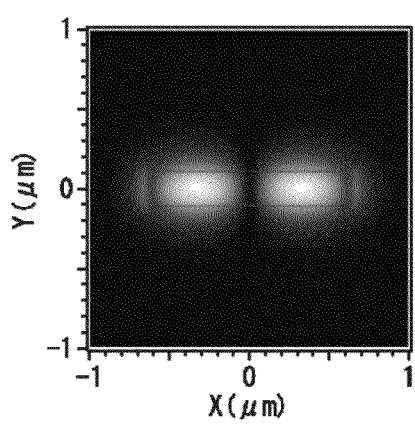
FIG. 4C is a simulation result showing the electric field distribution (Ex component) of TE1 in a mode conversion portion having a structure in which no protruding portion is provided on both sides in the width direction.
Figure 4F:
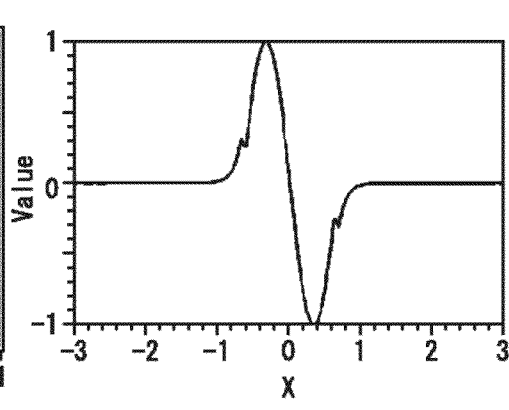
FIG. 4F is a graph showing an Ex component when Y=0 µm in FIG. 4C.
Figure 4G:
FIG. 4G is a scale corresponding to the electric field distribution of FIGS. 4A to 4C.

FIG. 4C shows the electric field distribution (Ex component) of TE1 in a mode conversion portion having a structure in which no protruding portion is provided on both sides in the width direction, and FIG. 4F shows an Ex component when Y=0 μm in FIG. 4C.

When the Ex component of TE1 shown in FIG. 4E is compared with the Ex component of TE1 shown in FIG. 4F, the positions of two peak portions of Ex components (distance between two peak portions of Ex components) and each width of each peak portion of Ex components (see FIG. 4D) in the electric field distributions of TE1 are different. In addition, two peak portions in the Ex component of TE1 shown in FIG. 4E overlap two peak portions of the electric field distribution (Ex component) of TE0 of the input portions 11 and 12 more than two peak portions in the Ex component of TE1 shown in FIG. 4F. That is, by providing the protruding portions 13a and 13b in the mode conversion portion 13, the overlap of two peak portions between the electric field distribution (Ex component) of TE0 of the input portions 11 and 12 and the electric field distribution (Ex component) of TE1 of the mode conversion portion 13 is increased. For this reason, since highly efficient coupling becomes possible at the boundary between the input portions 11 and 12 and the mode conversion portion 13 where a discontinuous waveguide change occurs, the loss is reduced. Therefore, in the high-order mode conversion combining element 10 according to the present embodiment, it is possible to reduce the influence of manufacturing error by using the input portions 11 and 12 provided with a gap interposed therebetween and the protruding portions 13a and 13b provided in the mode conversion portion 13.

Figure 3A:
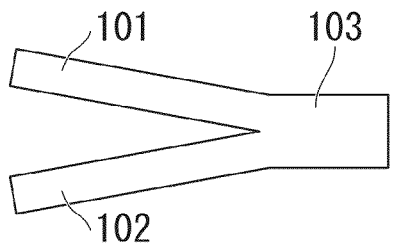
FIG. 3A is a diagram showing an ideal Y-branch.
Figure 3B:
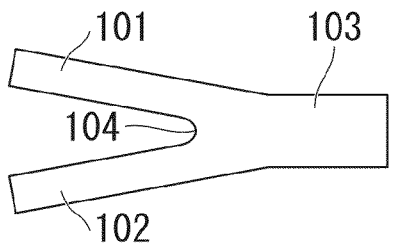
FIG. 3B is a diagram showing a Y-branch in consideration of actual manufacturing.
Figure 5:
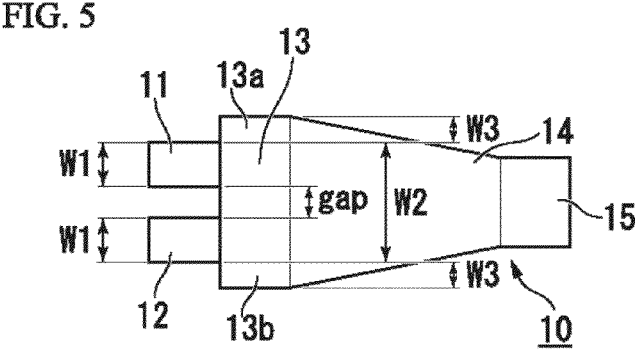
FIG. 5 is a model diagram showing an example of the high-order mode conversion combining element of the invention.
Figure 6A:
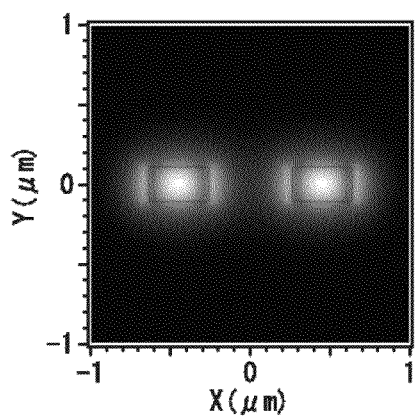
FIG. 6A is a simulation result (even mode) showing the electric field distribution (Ex component) in an input portion when TE0 is input (each rectangle in this diagram is a cross-section of the core).
Figure 6C:
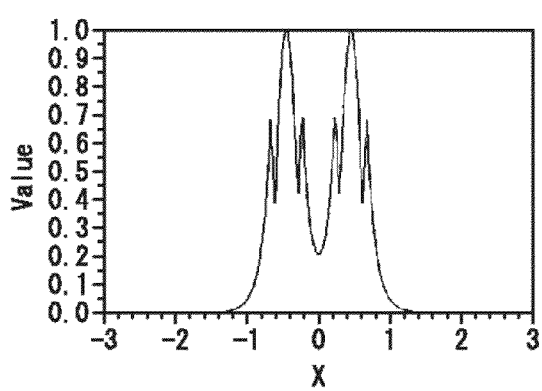
FIG. 6C is a graph (even mode) showing an Ex component when Y=0 μm in FIG. 6A.
Figure 6B:
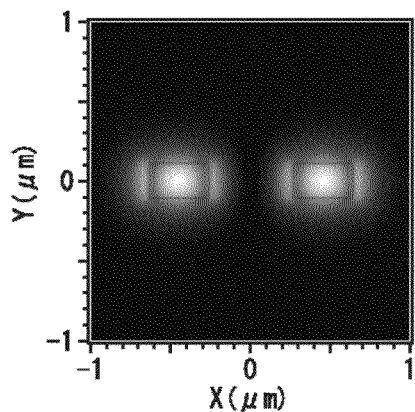
FIG. 6B is a simulation result (odd mode) showing the electric field distribution (Ex component) in an input portion when TE0 is input (each rectangle in this diagram is a cross-section of the core).
Figure 6D:
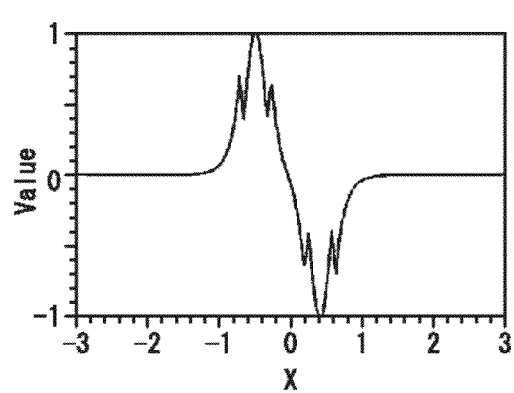
FIG. 6D is a graph (odd mode) showing an Ex component when Y=0 μm in FIG. 6B.

FIG. 5 shows a model diagram of the high-order mode conversion combining element 10 shown in FIG. 1, and the effect will be described based on this. The two input portions 11 and 12 have the same width W1, and are parallel to each other. The waveguide that forms each of the input portions 11 and 12 is a waveguide having a rectangular cross-section (rectangular waveguide). The distance (gap) between the two input portions 11 and 12 is fixed. W2 is equivalent to W1×2+gap. The width of the mode conversion portion 13 when the protruding portions 13a and 13b are added is W2+W3×2 and is larger than W2=W1×2+gap. An important parameter of each portion is shown in FIG. 5, and the case of W3>0 corresponds to the high-order mode conversion combining element 10 (refer to FIGS. 4B and 4E) of the present embodiment. In addition, the case of W3=0 corresponds to the Y-branch structure (refer to FIGS. 4C and 4F) in which there is no protruding portion and the input portions 11 and 12 are provided with a gap interposed therebetween. In addition, the Y-branch structure when W3=0 in FIG. 5 is not exactly the same as the Y-branch structure in FIG. 3B shown previously, but the rounded portion can be regarded to be almost flat. A dominant portion of the occurrence of loss is a connection portion between the input portions 11 and 12 and the mode conversion portion 13. Therefore, the Y-branch structure when W3=0 in FIG. 5 can be regarded to be the same structure as the Y-branch structure in FIG. 3B. As the distance gap between the input portions 11 and 12 becomes larger, manufacturing becomes easier. Accordingly, the distance gap is determined according to a situation.

Therefore, the width W3 of each of the protruding portions 13a and 13b at which the excess loss is reduced is taken into consideration, on the assumption that the waveguide width W1 and the distance gap of the input portions 11 and 12 are set to specific values.

In this application, "cross-section" written simply indicates a cross-section perpendicular to the guiding direction of light.

Hereinafter, a reduction in the loss due to providing a protruding portion will be described by comparing a case where the protruding portion is provided with a case where no protruding portion is provided.

First, the concept of coupling efficiency in a discontinuous connection at the boundary between the input portions 11 and 12 and the mode conversion portion 13 is shown. When thinking about the loss, a situation in which TE0 is input only to the input portion 11 is considered. In the high-order mode conversion combining element 10 of the present embodiment, the input portions 11 and 12 are arranged symmetrically with respect to the width direction. Accordingly, a case where TE0 is input only to the input portion 12 can be similarly considered. As shown in FIGS. 6A to 6D, when TE0 is input to the input portion 11, the input TE0 is expressed as a superposition of two modes (referred to as an even mode and an odd mode) having the same rate of power. These modes are coupled to the mode of the mode conversion portion 13 at the boundary between the input portions 11 and 12 and the mode conversion portion 13 (butt-coupling). Coupling efficiency T in this case is expressed by the following Formula (1) (components other than the Ex component are neglected since TE0 has the Ex component as a main component).

[Math. 1]

$$T = K \iint E_x^{TE0} \times (E_x^{TE1})^* dx dy \quad (1)$$

Here, symbols are defined as follows. * indicates a complex conjugate, and integration is performed over the entire cross-section of the boundary in the input portions 11 and 12 and the mode conversion portion 13.

$E_x^{TE0}$: Ex component of the electric field (superposition of an even mode and an odd mode) of TE0 in the input portion $E_x^{TE1}$: Ex component of the electric field of TE1 in the mode conversion portion K: another constant From Formula (1), it can be seen that the coupling efficiency T increases as the overlap between the electric field distributions increases. In addition, the electric field distribution of the even mode is symmetric with respect to the width direction, and the electric field distribution of the odd mode is antisymmetric with respect to the width direction. On the other hand, since the electric field distribution of TE1 of the mode conversion portion is antisymmetric with respect to the width direction, it can be seen that only the odd mode is coupled to TE1 of the mode conversion portion. When there is an input from only one of the two input portions, half of the input power is coupled to TE1 of the mode conversion portion as an odd mode. It can be seen that the loss of the principle (principle loss) at the time of coupling with TE1 is $-10 \log_{10}(½)$, that is, 3 dB. Therefore, the excess loss from this principle loss will be considered hereinbelow.

Figure 7:
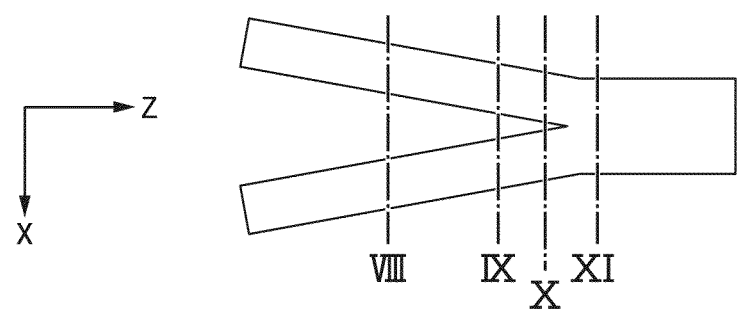
FIG. 7 is a plan view for explaining the position in an ideal Y-branch structure.
Figure 8A:
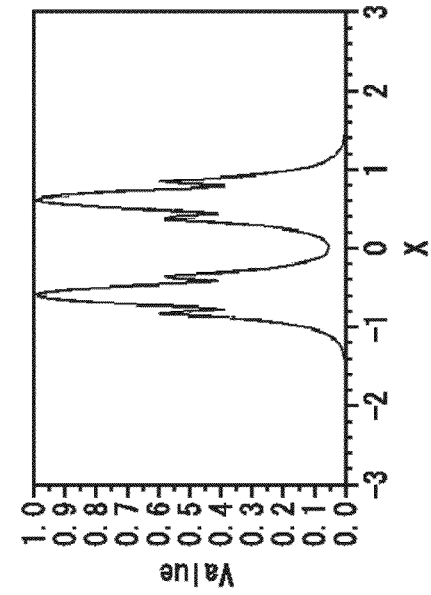
FIG. 8A is a simulation result (even mode) showing the electric field distribution (Ex component) at VIII of FIG. 7.
Figure 8C:
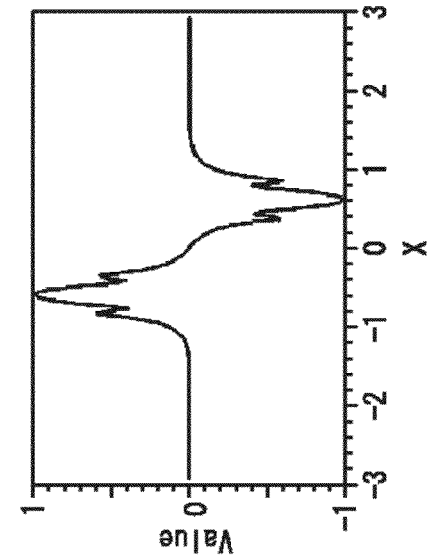
FIG. 8C is a graph (even mode) showing an Ex component when Y=0 μm in FIG. 8A.
Figure 8B:
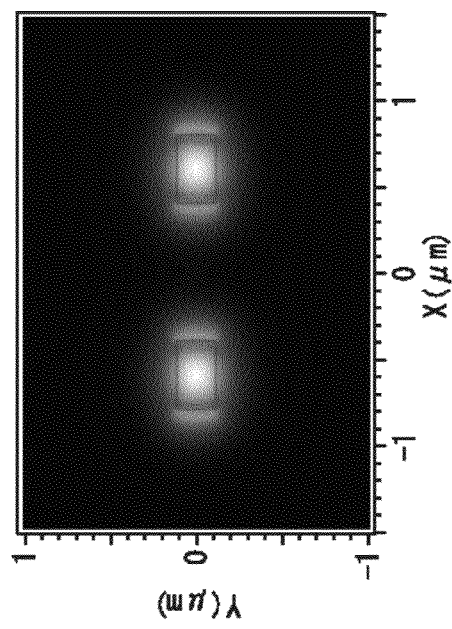
FIG. 8B is a simulation result (odd mode) showing the electric field distribution (Ex component) at VIII of FIG. 7.
Figure 8D:
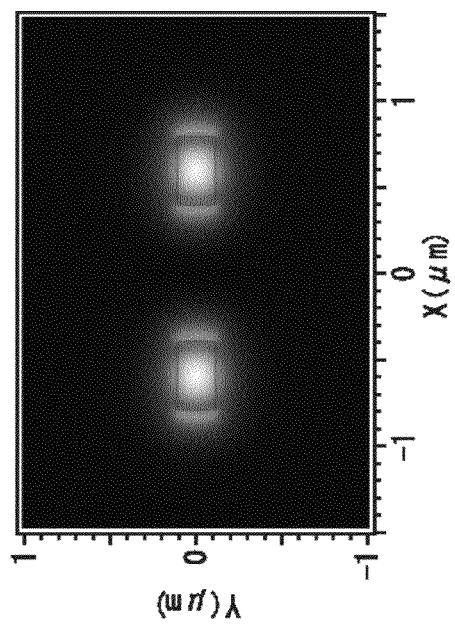
FIG. 8D is a graph (odd mode) showing an Ex component when Y=0 μm in FIG. 8B.
Figure 9A:
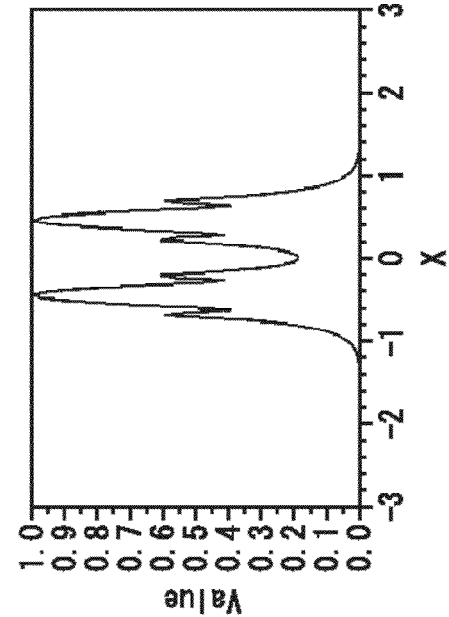
FIG. 9A is a simulation result (even mode) showing the electric field distribution (Ex component) at IX of FIG. 7.
Figure 9C:
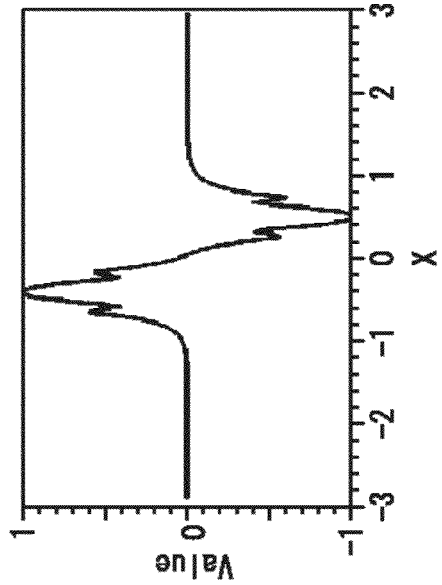
FIG. 9C is a graph (even mode) showing an Ex component when Y=0 μm in FIG. 9A.
Figure 9B:
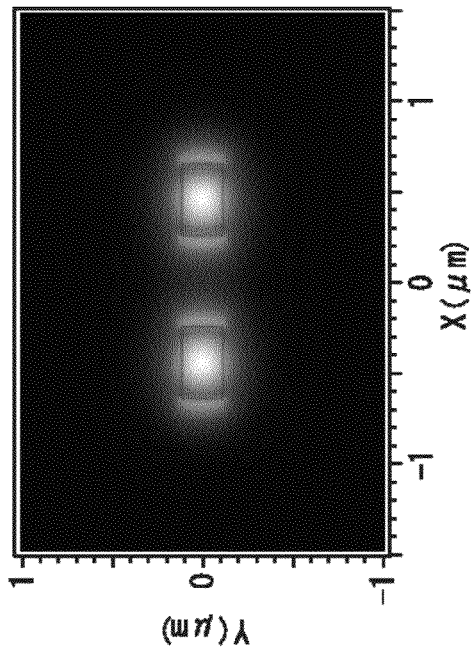
FIG. 9B is a simulation result (odd mode) showing the electric field distribution (Ex component) at IX of FIG. 7.
Figure 9D:
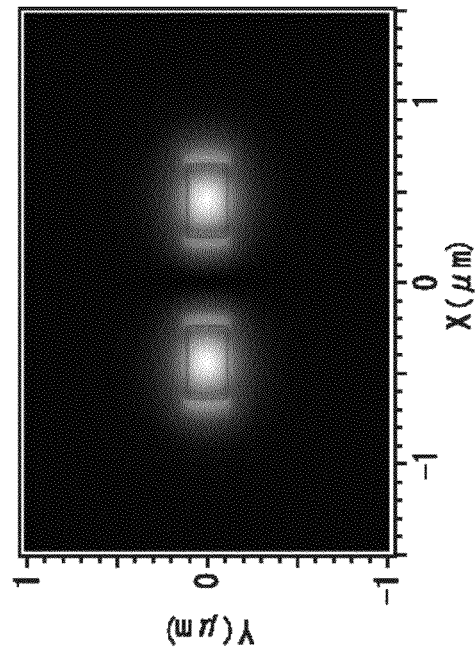
FIG. 9D is a graph (odd mode) showing an Ex component when Y=0 μm in FIG. 9B.
Figure 10C:
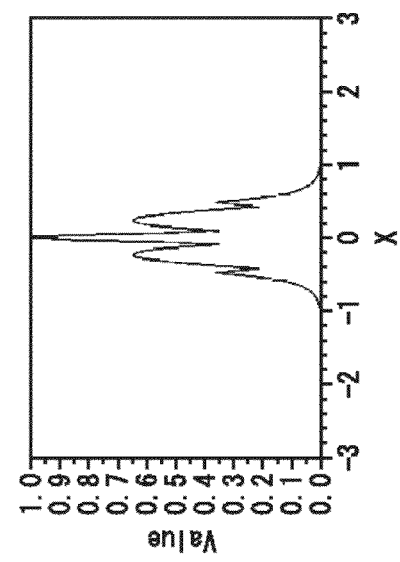
FIG. 10C is a graph (even mode) showing an Ex component when Y=0 μm in FIG. 10A.
Figure 10D:
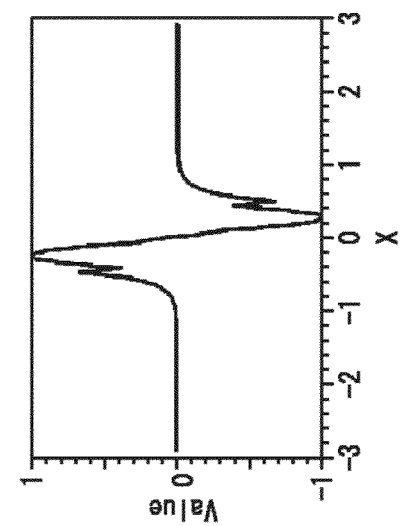
FIG. 10D is a graph (odd mode) showing an Ex component when Y=0 μm in FIG. 10B.
Figure 10A:
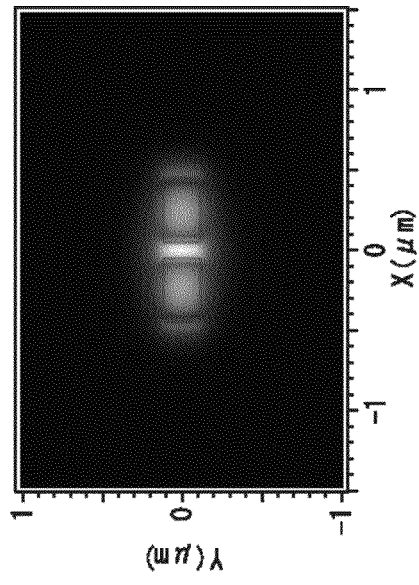
FIG. 10A is a simulation result (even mode) showing the electric field distribution (Ex component) at X of FIG. 7.
Figure 10B:
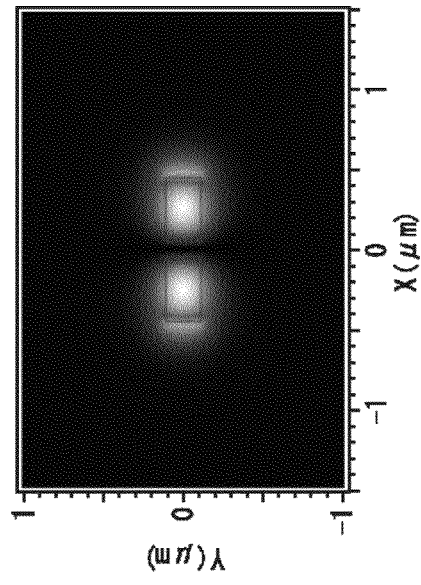
FIG. 10B is a simulation result (odd mode) showing the electric field distribution (Ex component) at X of FIG. 7.
Figure 11A:
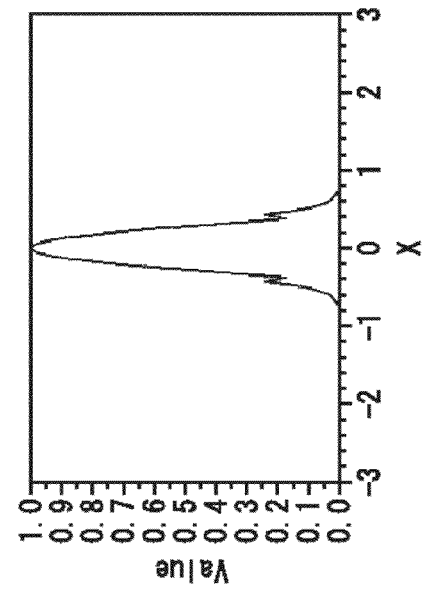
FIG. 11A is a simulation result (even mode) showing the electric field distribution (Ex component) at XI of FIG. 7.
Figure 11C:
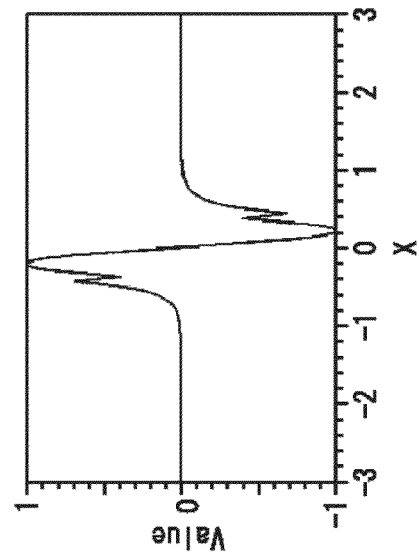
FIG. 11C is a graph (even mode) showing an Ex component when Y=0 μm in FIG. 11A.
Figure 11B:
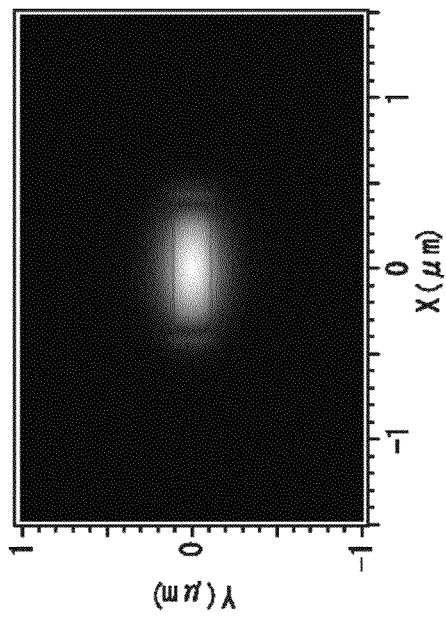
FIG. 11B is a simulation result (odd mode) showing the electric field distribution (Ex component) at XI of FIG. 7.
Figure 11D:
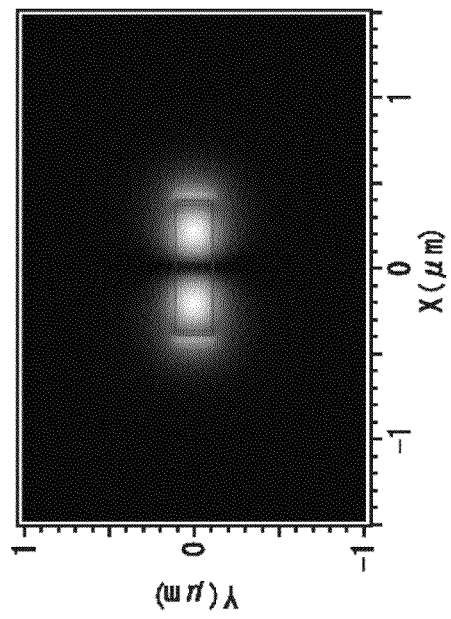
FIG. 11D is a graph (odd mode) showing an Ex component when Y=0 μm in FIG. 11B.

Then, based on Formula (1), the effect in the case of an ideal Y-branch structure that is a known technique (FIGS. 3A and 7), the effect in the case of a Y-branch in consideration of manufacturing error (when W3=0 in FIG. 5), and the effect in the case of the high-order mode conversion combining element 10 of the present embodiment (when W3>0 in FIG. 5) are compared. From Formula (1), in order to increase the coupling efficiency T (reduce the loss), it is necessary to increase the overlap between the electric field distribution of the odd mode of the input portions 11 and 12 and the electric field distribution of TE1 of the mode conversion portion 13. FIGS. 8A to 11D show transition diagrams of the electric field distribution of the odd mode and the even mode in the ideal Y distribution structure. FIGS. 8A to 11D show the electric field distribution at each of positions indicated by VIII, IX, X, and XI in FIG. 7. FIGS. 8A, 9A, 10A, and 11A show the electric field distribution on the cross-section of the even mode. FIGS. 8B, 9B, 10B, and 11B show the electric field distribution on the cross-section of the odd mode. FIGS. 8C, 9C, 10C, and 11C show the Ex component of the even mode when Y=0 µm. FIGS. 8D, 9D, 10D, and 11D show the Ex component of the odd mode when Y=0 µm. These results show that two modes (even mode and odd mode) of the input portion transition gradually to the even mode (TE0) and the odd mode (TE1) of the combining portion. In this transition, lossless conversion (even mode->TE0, odd mode->TE1) can be realized in principle by setting the Y-branch to be sufficiently long. However, when actual manufacturing is considered as described above, the portion of IX in FIG. 7 becomes like a portion of XIII in FIG. 12 since the base of the Y-branch is rounded (regarded to be flat). In this case, since mode distributions in FIGS. 9A to 9D are input to waveguides having very different mode distributions, such as mode distributions in FIGS. 13A to 13D, loss occurs (loss at this time can be calculated from Formula (1)).

Figure 12:
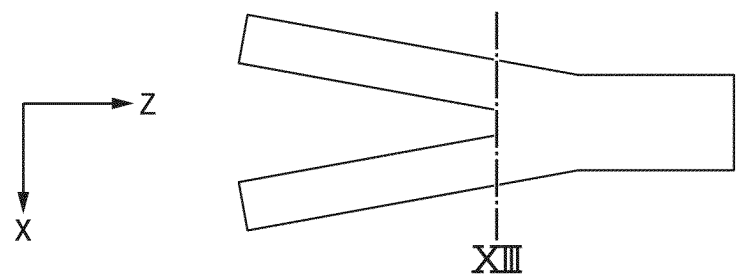
FIG. 12 is a plan view for explaining the place where the base of the Y-branch is flat.
Figure 13A:
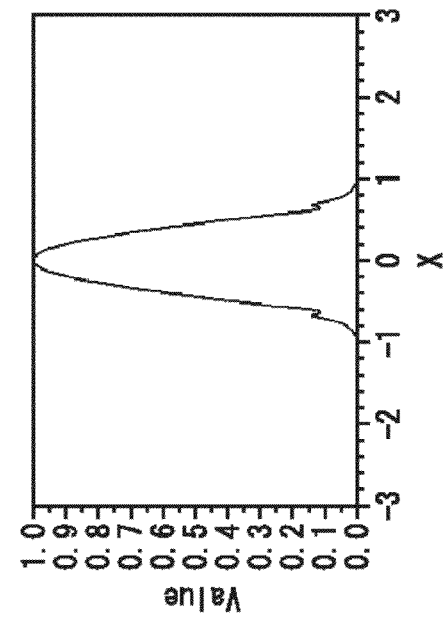
FIG. 13A is a simulation result (even mode) showing the electric field distribution (Ex component) at XIII of FIG. 12.
Figure 13C:
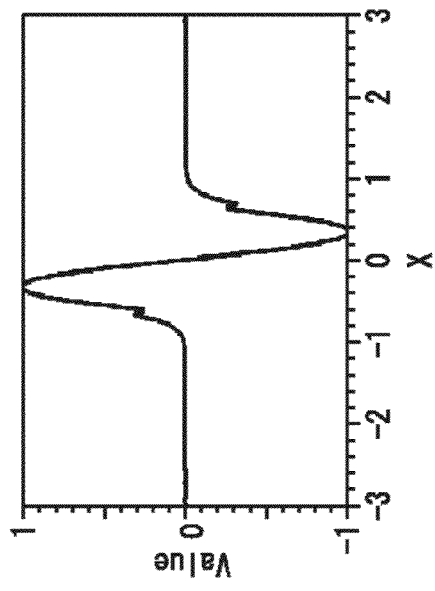
FIG. 13C is a graph (even mode) showing an Ex component when Y=0 μm in FIG. 13A.
Figure 13B:
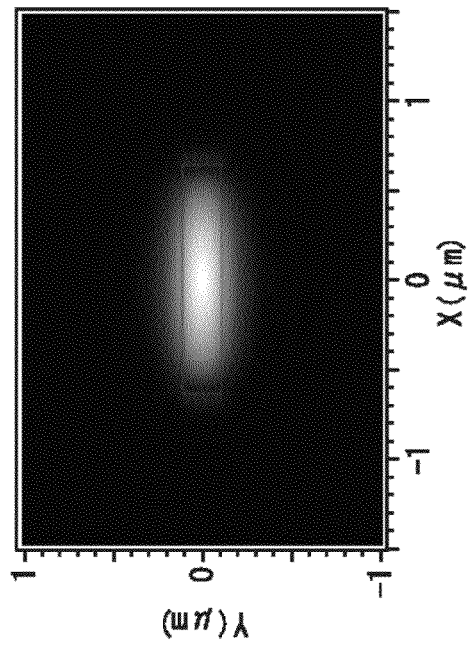
FIG. 13B is a simulation result (odd mode) showing the electric field distribution (Ex component) at XIII of FIG. 12.
Figure 13D:
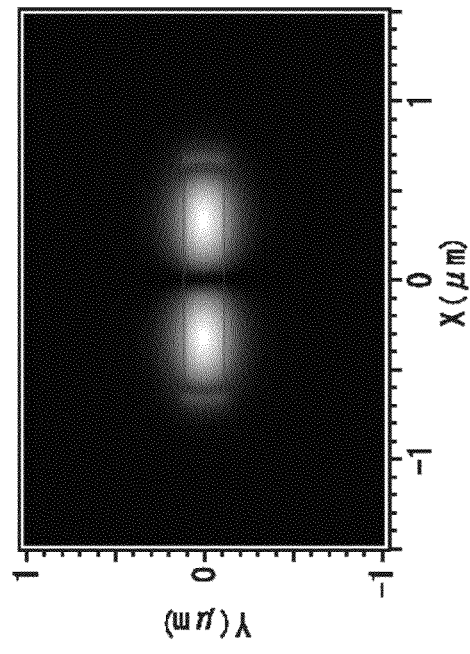
FIG. 13D is a graph (odd mode) showing an Ex component when Y=0 μm in FIG. 13B.

This case will be described in more detail. When the base of the Y-branch is flat as shown in FIG. 12, if coupling with TE1 of the mode conversion portion in which two peaks of the electric field distribution are closer to the center than two peaks of the electric field distribution of the odd mode of two input portions are occurs in a stage where the two peaks of the electric field distribution of the odd mode of two input portions are not sufficiently close to the center, the overlap of the electric field distributions is reduced. For this reason, the coupling efficiency T is reduced as shown in Formula (1). Therefore, in the high-order mode conversion combining element 10 of the present embodiment, in order to bring the electric field distribution of TE1 of the mode conversion portion 13 close to the electric field distribution of the odd mode of the input portions 11 and 12 in which two peaks of the electric field distribution are not sufficiently close to the center, the protruding portions 13a and 13b are provided (that is, W3>0). This configuration has the above-described effect for the following reasons. By providing the protruding portions 13a and 13b, the waveguide width is increased by W3×2 in the mode conversion portion 13. As the waveguide width increases, the mode of the waveguide cross-section also increases. In this case, since the two peaks of TE1 are also away from the center toward the outside, it is possible to bring the TE1 close to the odd mode of the input portions 11 and 12 in which two peaks of the electric field distribution are not sufficiently close to the center.

As the parameters in FIGS. 4A to 4F described above, W1=400 nm, gap=500 nm, and W2=1300 nm (FIG. 5), the wavelength of incident light is 1550 nm, and the height of the core is 220 nm. FIGS. 4A to 4F show the electric field distribution of each cross-section of the input portions 11 and 12 and the mode conversion portion 13. FIGS. 4B and 4E show a result when there is a protruding portion, where W3=198 nm. FIGS. 4C and 4F show a result when there is no protruding portion, where W3=0 nm. From these diagrams, it can be seen that the peak of TE1 when there is a protruding portion is away from the center and the center of each peak matches the mode of the input portions 11 and 12.

Figure 14:
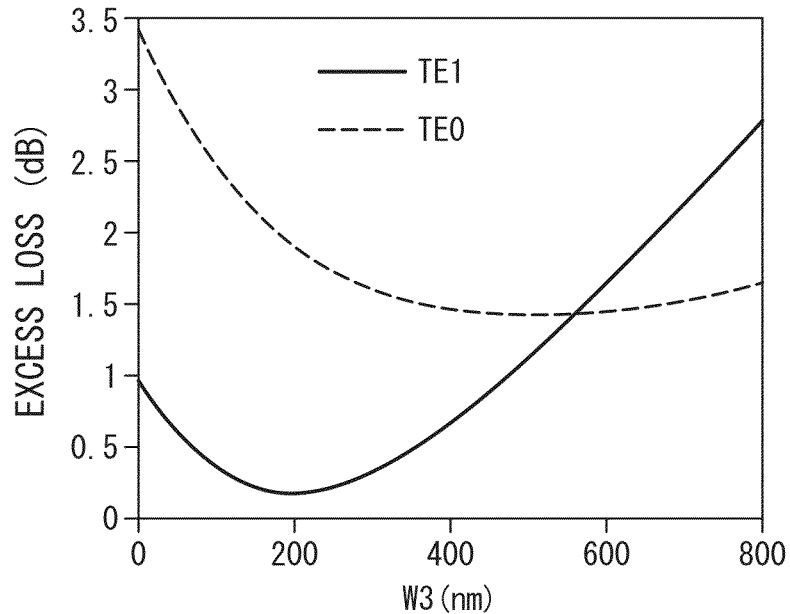
FIG. 14 is a simulation result of the relationship between the width W3 of a protruding portion and the excess loss.

For a quantitative comparison, FIG. 14 shows a result of the relationship between the width W3 of a protruding portion and the excess loss that is obtained by simulation using a finite element method. As parameters other than W3, the same values as when calculating the electric field distribution in FIGS. 4A to 4F are used. In FIG. 14, TE1 indicates an excess loss at the time of conversion to TE1 in the mode conversion portion 13 when TE0 is input from the input portion 11, and TE0 indicates an excess loss at the time of conversion to TE0 in the mode conversion portion 13 when TE0 is input from the input portion 11. From FIG. 14, it can be seen that the loss when W3>0 nm is smaller than the loss when W3=0 nm. In particular, the loss of TE1 is 0.80 dB when W3=0 nm, while the loss of TE1 is 0.16 dB when W3=198 nm at which the minimum loss is obtained. Therefore, it can be seen that the loss can be significantly reduced.

On the other hand, if W3 is too large, the two peaks of TE1 of the mode conversion portion 13 are too far from the center of the odd mode of the input portions 11 and 12. For this reason, the excess loss is increased. Therefore, it is necessary to find an appropriate W3. In the structure of the high-order mode conversion combining element 10 of the present embodiment, as W3 increases from 0 nm, the excess loss decreases first, but the excess loss increases after reaching a certain minimum value. Therefore, compared with the related art of W3=0 nm, the present embodiment is effective when W3 is smaller than a value (referred to as W3max) which is not 0 and at which the same loss as the excess loss when W3=0 nm occurs. That is, it is the characteristic structure of the present embodiment to satisfy 0<W3<W3max. In FIG. 14, W3max=395 nm.

Next, a difference from the Y-branch element, which has a structure similar to the high-order mode conversion combining element 10 of the present embodiment and which is disclosed in Non-patent document 3, will be described. Combining and Splitting of modes corresponding to TE0 are described in Non-patent document 3. In order to reduce the excess loss, a portion corresponding to the protruding portion in the present embodiment is provided in the Y-branch element disclosed in Non-patent document 3. By adjusting the width, the excess loss of the mode corresponding to TE0 is reduced. However, unlike the present embodiment, there is no mention about "from TE0 to TE1" in Non-patent document 3. Therefore, in terms of conversion to another mode called TE1, it is not obvious whether or not the structure disclosed in Non-patent document 3 can be applied. In the present embodiment, in relation to the mode conversion that cannot be estimated at all from Non-patent document 3, two peak positions of the electric field distribution of TE1 by the protruding portion can be adjusted from the similarity of the mode shapes of the odd mode of the input portions 11 and 12 and the TE1 of the mode conversion portion 13. In addition, the high-order mode conversion combining element 10 according to the present embodiment has a structure in which low-loss coupling can be realized by performing adjustment so that the peak positions match each other. Therefore, the present embodiment is completely different from the disclosure of Non-patent document 3 in that low-loss mode conversion is realized focusing on the similarity of the electric field distribution of the odd mode of the input portions 11 and 12 and the electric field distribution of the high-order mode of the mode conversion portion 13.

Finally, other characteristics/effects of the high-order mode conversion combining element 10 of the present embodiment will be described.

As a first point, in FIG. 5, it is preferable that the length (referred to as L1) of the mode conversion portion 13 of the linear waveguide in the longitudinal direction is not small. For example, when L1 becomes 0, light is incident on the tapered portion 14 whose waveguide width changes abruptly after being incident on the mode conversion portion 13 from the input portions 11 and 12. Accordingly, an abrupt change in the electric field distribution occurs in this portion. As a result, loss occurs. Therefore, it is preferable that L1 not be small so that a change in the electric field distribution does not occur abruptly.

As a second point, in FIG. 5, the tapered portion 14 and the output portion 15 are connected after the mode conversion portion 13. These portions do not contribute to mode conversion, but the waveguide width of the mode conversion portion is determined by W1, gap, and W3 that is determined according to W1 and gap. Therefore, it is preferable to provide a tapered waveguide, which makes a connection between waveguides having different waveguide widths, for connection with a general external optical circuit having a certain waveguide width.

As a third point, in the present embodiment, the principle of low loss is different from the combining and splitting between TE0 disclosed in Non-patent document 3. Therefore, when TE0 is input from the input portion 11, the value of W3 at which the excess loss at the time of conversion to TE1 of the mode conversion portion 13 is minimized is largely different from the value of W3 at which the excess loss at the time of conversion to TE0 of the mode conversion portion 13 is minimized (refer to FIG. 14). For this reason, at the width W3 at which the excess loss at the time of conversion to TE1 is minimized, the excess loss at the time of conversion to TE0 is increased. This is advantageous when performing polarization multiplexing transmission by converting TE1 to TM0 and performing polarization multiplexing of another signal and added TE0 using the TM0 as a transmission signal, which will be described later in the second or fourth or subsequent embodiments. In this case, TE0 that is excited at the same time as TE1 is finally mixed with TE0 responsible for the transmission signal, and this leads to degradation of the polarization extinction ratio. Therefore, the present embodiment in which the input TE0 is coupled to TE1 with high efficiency but coupled to TE0 with low efficiency in the mode conversion portion is advantageous in terms of the polarization extinction ratio.

Next, examples of the use of the high-order mode conversion combining element 10 of the present embodiment will be described.

Use Example 1

When TE0 is Input Only to the Input Portion 11

In this case, TE0 can be converted to TE1. However, a loss of 3 dB occurs as a principle loss. This is the same as a combining element for the normal TE0 (for example, ideal Y-branch or MMI). In addition, when TE0 is input only to the input portion 12, the phase is shifted by $\pi$ for the case where TE0 is input to the input portion 11.

Use Example 2

TE0 Having Phases that are Different by $\pm\pi/2$ is Input to the Input Portions 11 and 12

In this case, the phase of one input TE0 is shifted by $\pi$ in an input portion, but the phase difference is one of $\pm\pi/2$. Accordingly, this is the same as the case of independent input without interference. For this reason, loss in the use example 2 is a value obtained by adding the principle loss of 3 dB in the same manner as in the use example 1.

Use Example 3

When TE0 Having Opposite Phases is Input to the Input Portion 11 and 12

TE0 input to the input portions 11 and 12 becomes a superposition of an even mode and an odd mode. When the input TE0 has opposite phases (phase is shifted by $\pi$), an odd mode by TE0 of the input portion 11 and an odd mode by TE0 of the input portion 12 have the same phase when coupled with TE1 of the mode conversion portion 13. Accordingly, the odd modes interfere with each other so as to strengthen each other. On the other hand, since even modes have opposite phases, the even modes interfere with each other so as to weaken each other. Since the even mode and the odd mode are generated such that the power ratio is 50:50, a total amount of energy based on the input of only the odd modes is generated as a result of interference. In this case, therefore, principle loss does not occur, and the excess loss shown in FIG. 14 (or FIGS. 24A to 26C in Example 1) becomes a loss as it is. In this case, TE0 is not generated at all in the mode conversion portion.

Modification of the First Embodiment

Structure in which a Bent Waveguide is Connected

As a modification of the first embodiment described above, as shown in FIG. 16, there is a structure in which bent waveguides 17a and 17b are connected before the input portions 11 and 12. Waveguides of the external optical circuit connected to the input portions 11 and 12 do not necessarily need to be provided while maintaining a distance indicated by gap (refer to FIG. 5) in the first embodiment. Therefore, in order to connect two separated waveguides, a structure can also be considered in which the bent waveguides 17a and 17b are connected before the input portions 11 and 12. In this case, the bending radius is preferably set to the extent that the loss of guided TE0 does not become too large. In addition, the bent waveguides 17a and 17b are not directly connected to the mode conversion portion 13 of the present embodiment but connected to linear waveguides that form the input portions 11 and 12. In this case, it is preferable that the length L2 of the input portions 11 and 12 in the longitudinal direction not be too short. The mode of light guided through the bent waveguide is distorted in the outer peripheral direction. Therefore, it is necessary to eliminate the influence of the distorted mode. If L2 is too short, the mode with distorted electric field distribution may be coupled to the mode conversion portion 13. As a result, there is a possibility that the effect assumed may be reduced. As L2 is enough to avoid this, for example, the length of about 1 wavelength (assumed to be the wavelength in a vacuum) is sufficient. This is because 1 wavelength is in the order of the waveguide required for the light incident on the waveguide to settle down to the steady state (that is, electric field distribution of the mode).

Figure 16:
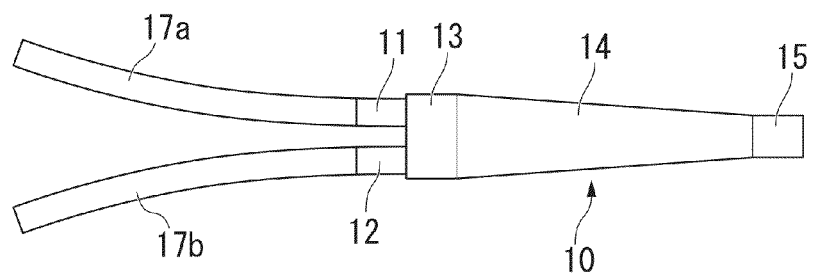
FIG. 16 is a plan view showing an example of a high-order mode conversion combining element in which bent waveguides are connected.

In FIG. 16, the bent waveguides 17a and 17b are connected before the two input portions 11 and 12, respectively. However, the invention is not particularly limited to this, and the bent waveguide may be connected only before one of the input portions 11 and 12.

Second Embodiment

Figure 17:
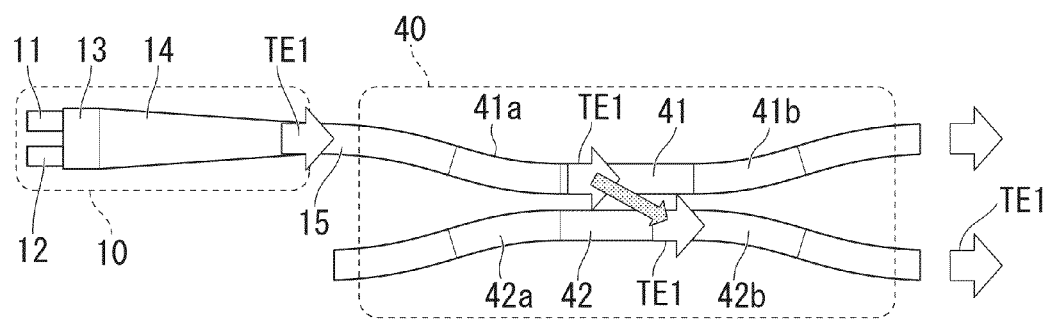
FIG. 17 is a plan view showing an example of the structure in which a high-order mode splitter is connected after a high-order mode conversion combining element.

High-Order Mode Conversion Combining Element Having a Downstream End to which a High-Order Mode Splitter is Connected In the use examples 1 and 2, a mode of a higher order than TE0 or TE1 (TE mode having a higher effective refractive index than TE1) is generated in addition to TE1. Also, in the use example 3, when the phase difference of input TE0 is shifted by it, TE0 or the like is generated similarly. Therefore, as shown in FIG. 17, an embodiment can be mentioned in which a high-order mode splitter 40 for extracting TE1 is connected after the high-order mode conversion combining element 10 of the first embodiment. As the high-order mode splitter 40, there is a directional coupler type device (refer to Japanese Patent Application No. 2012-183305).

The high-order mode splitter 40 shown in FIG. 17 can extract (separate) only TE1 to a waveguide 42 by making the coupling coefficient difference sufficiently large between two or more kinds of propagation modes, which can be guided through a waveguide 41, by appropriately selecting the distance between the two parallel waveguides 41 and 42 that form a directional coupler. That is, among the modes input to the waveguide 41, TE1 is output from the waveguide 42, and the other modes (modes other than TE1) are output from the waveguide 41.

Bent waveguides 41a, 41b, 42a, and 42b are connected before and after the two parallel waveguides 41 and 42, respectively. In order to increase the extinction ratio of TE0 and TE1, the high-order mode splitter 40 may be connected to multiple stages. In addition, when TE0 is input to the waveguide 42 at the same time as the input of TE1 to the waveguide 41, a signal (TE0/TE1) obtained by multiplexing both TE0 and TE1 can be output from the waveguide 42 (for example, refer to a DP-QPSK modulator of a sixth embodiment to be described later).

Third Embodiment

Figure 18:
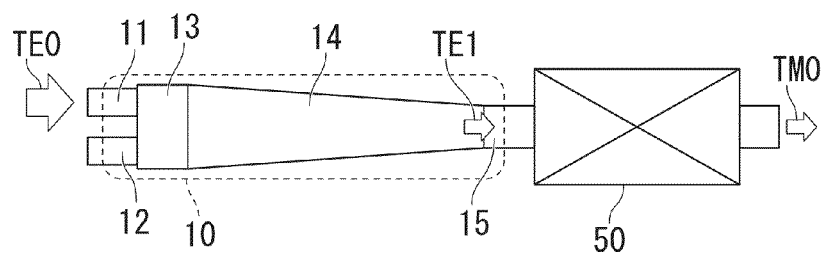
FIG. 18 is a plan view showing an example of the structure in which a high-order polarization conversion element is connected after a high-order mode conversion combining element.
Figure 19A:
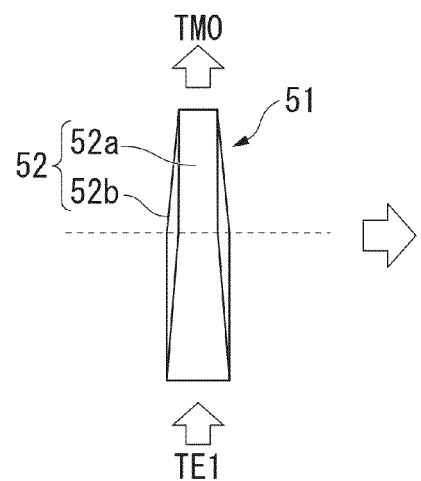
FIG. 19A is a plan view showing an example of a high-order polarization conversion element in which the core shape is vertically asymmetric.
Figure 19B:
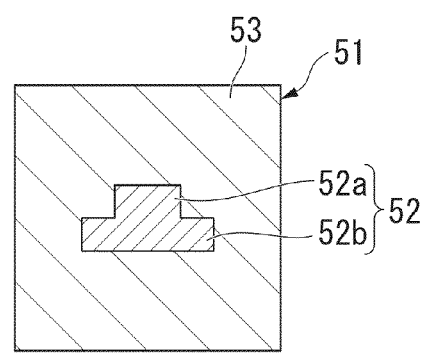
FIG. 19B is a cross-sectional view showing an example of a high-order polarization conversion element in which the core shape is vertically asymmetric.

High-Order Mode Conversion Combining Element in which a High-Order Polarization Conversion Element is Connected after an Output Portion As disclosed in Non-patent document 1 and Non-patent document 2, an embodiment can be considered in which the input TE0 is output as TM0 by connecting a high-order polarization conversion element after an output portion through which TE1 generated in the mode conversion portion 13 is guided (refer to FIG. 18). FIG. 18 shows a structure in which a high-order polarization conversion element 50 is connected after the high-order mode conversion combining element 10 of the first embodiment. The high-order polarization conversion element 50 preferably has a function of converting TE1 to TM0. As an example, a tapered waveguide can be mentioned in which the materials of upper and lower claddings are changed and the refractive index distribution are vertically asymmetric as disclosed in Non-patent document 1 and Non-patent document 2. In addition, a high-order polarization conversion element 51 using a two-stage tapered waveguide with an asymmetric core shape, which is disclosed in Japanese Patent Application No. 2013-135490, can also be mentioned (refer to FIGS. 19A and 19B). FIG. 19B shows a cross-section at the location of the dotted line with the right arrow of FIG. 19A. In the high-order polarization conversion element 51, the cross-sectional shape of a core 52 is vertically asymmetric by making the width of an upper core 52a different from the width of a lower core 52b. In addition, since the width of the upper core 52a or the width of the lower core 52b changes continuously with respect to the light guiding direction of the optical waveguide, it is possible to convert TE1 to TM0. In the case of the high-order polarization conversion element 51, since the structure of the core 52 is vertically asymmetric, the structure of a cladding 53 does not require vertical asymmetry.

Fourth Embodiment

Figure 20:
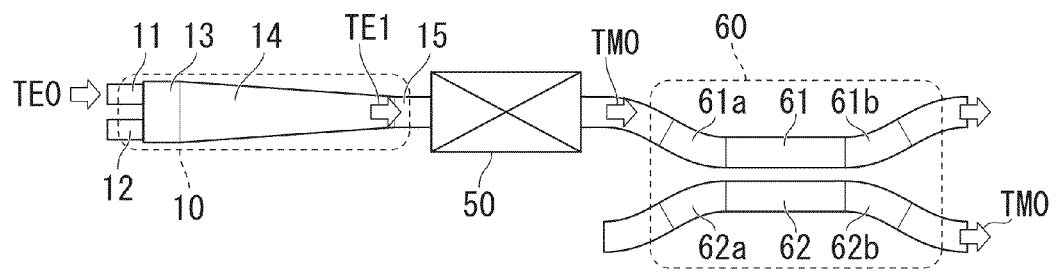
FIG. 20 is a plan view showing an example of the structure in which a high-order polarization conversion element and a polarization beam splitter are connected after a high-order mode conversion combining element.

High-Order Mode Conversion Combining Element Having a Downstream End to which a High-Order Polarization Conversion Element and a Polarization Beam Splitter are Connected As described above, in the high-order mode conversion combining element 10, modes other than TE1 may be generated. Therefore, for example, as shown in FIG. 20, a structure can also be considered in which the high-order polarization conversion element 50 is connected after the high-order mode conversion combining element 10 in order to convert TE1 to TM0 and a polarization beam splitter 60 for extracting TM0 is connected after the high-order polarization conversion element 50.

As a polarization beam splitter, a directional coupler type polarization beam splitter shown in Hiroshi Fukuda, et al., "Ultrasmall Polarization Splitter Based on Silicon Wire Waveguides," OPTICS EXPRESS, Vol. 14, No. 25, 12401 (2006) can be mentioned.

The polarization beam splitter 60 can extract (separate) only TM0 from a waveguide 61 to a waveguide 62 by appropriately selecting the distance between the two parallel waveguides 61 and 62 that form a directional coupler. That is, among the modes input to the waveguide 61, TM0 is output from the waveguide 62, and the other modes (modes other than TM0) are output from the waveguide 61.

Bent waveguides 61a, 61b, 62a, and 62b are connected before and after the two parallel waveguides 61 and 62. Only one of the bent waveguides 61a and 62a before the waveguides 61 and 62 may be provided, and only one of the bent waveguides 61b and 62b after the waveguides 61 and 62 may be provided.

In order to increase the polarization extinction ratio of TE0 and TM0, the polarization beam splitter 60 may be connected to multiple stages. In addition, when TE0 is input to the waveguide 62 at the same time as the input of TM0 to the waveguide 61, a signal (TE0/TM0) obtained by multiplexing both TE0 and TM0 can be output from the waveguide 62 (for example, refer to a DP-QPSK modulator of a fifth embodiment to be described later).

Fifth Embodiment

DP-QPSK Modulator: Case 1

A high-order mode conversion combining element can be used in Dual Polarization-Quadrature Phase Shift Keying (DP-QPSK) disclosed in P. Dong, C. Xie, L. Chen, L. L. Buhl, and Y.-K. Chen, "112-Gb/s Monolithic PDM-QPSK Modulator in Silicon", in European Conference and Exhibition on Optical Communication (2012), Vol. 1, p. Th.3. B.1.

Figure 21:
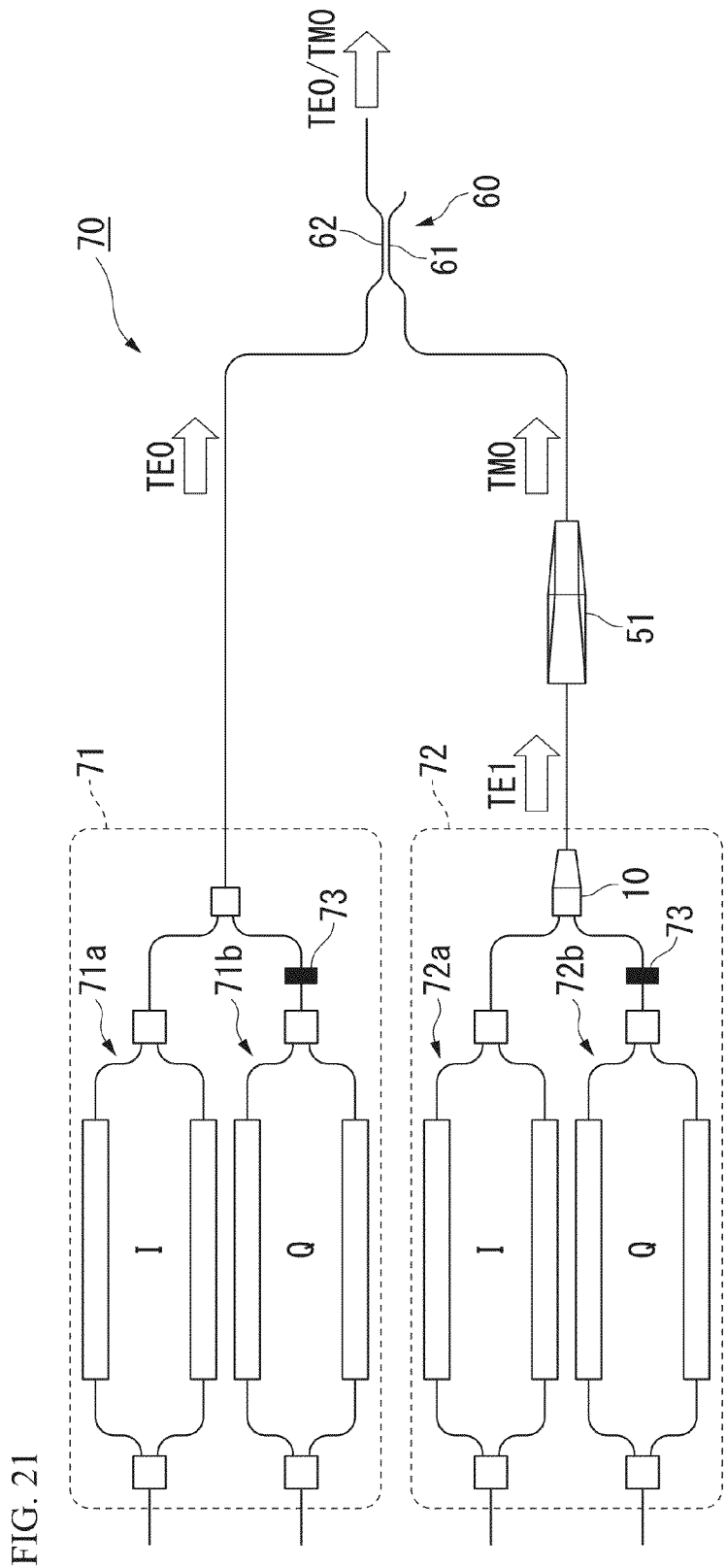
FIG. 21 is a schematic plan view showing a DP-QPSK modulator of a fifth embodiment.

FIG. 21 shows an embodiment of a DP-QPSK modulator using the high-order mode conversion combining element 10 of the embodiment described above. Each of QPSK modulator 71 and 72 includes two Mach-Zehnder (MZ) interferometers. An output signal of one MZ interferometer 71a or 72a is assumed to be an in-phase component (I signal), and an output signal of the other MZ interferometer 71b or 72b is assumed to be a quadrature phase component (Q signal).

In order to give a phase difference of $\pi/2$ between the I and Q signals, each of the QPSK modulators 71 and 72 has a phase adjusting portion 73. TE0 is input to each MZ interferometer. Then, in one QPSK modulator 72, TE0 in which the I and Q signals are superimposed is input to the high-order mode conversion combining element 10 after a phase difference of $\pi/2$ is given through the phase adjusting portion 73. As a result, the TE0 is converted to TE1. Here, the high-order mode conversion combining element 10 can be used as in the use example 2 of the first embodiment since the phase adjusting portion 73 of the QPSK modulator is used. Then, the high-order polarization conversion element 51 and the polarization beam splitter 60 are connected after the QPSK modulator 72 as in the fourth embodiment, and finally, TE0 and TM0 having independent QPSK signals are output in a mixed form. That is, in the DP-QPSK modulator 70, the QPSK signal of TE0 output from the QPSK modulator 71 is output to the waveguide 62 of the polarization beam splitter 60 as it is, the QPSK signal of TE0 output from the QPSK modulator 72 is converted to TM0 by the high-order mode conversion combining element 10 and the high-order polarization conversion element 51 and is then output to the waveguide 61 of the polarization beam splitter 60, and the polarization-multiplexed signal (TE0/TM0) is output from the waveguide 62 of the polarization beam splitter 60. In addition, the method of modulating TE0 is not limited to QPSK. Even if a modulator having a simpler configuration, a modulator having a more complicated configuration, or the like is used, it is possible to perform polarization multiplexing using the high-order mode conversion combining element of the embodiment described above.

Sixth Embodiment

DP-QPSK Modulator: Case 2

Figure 22:
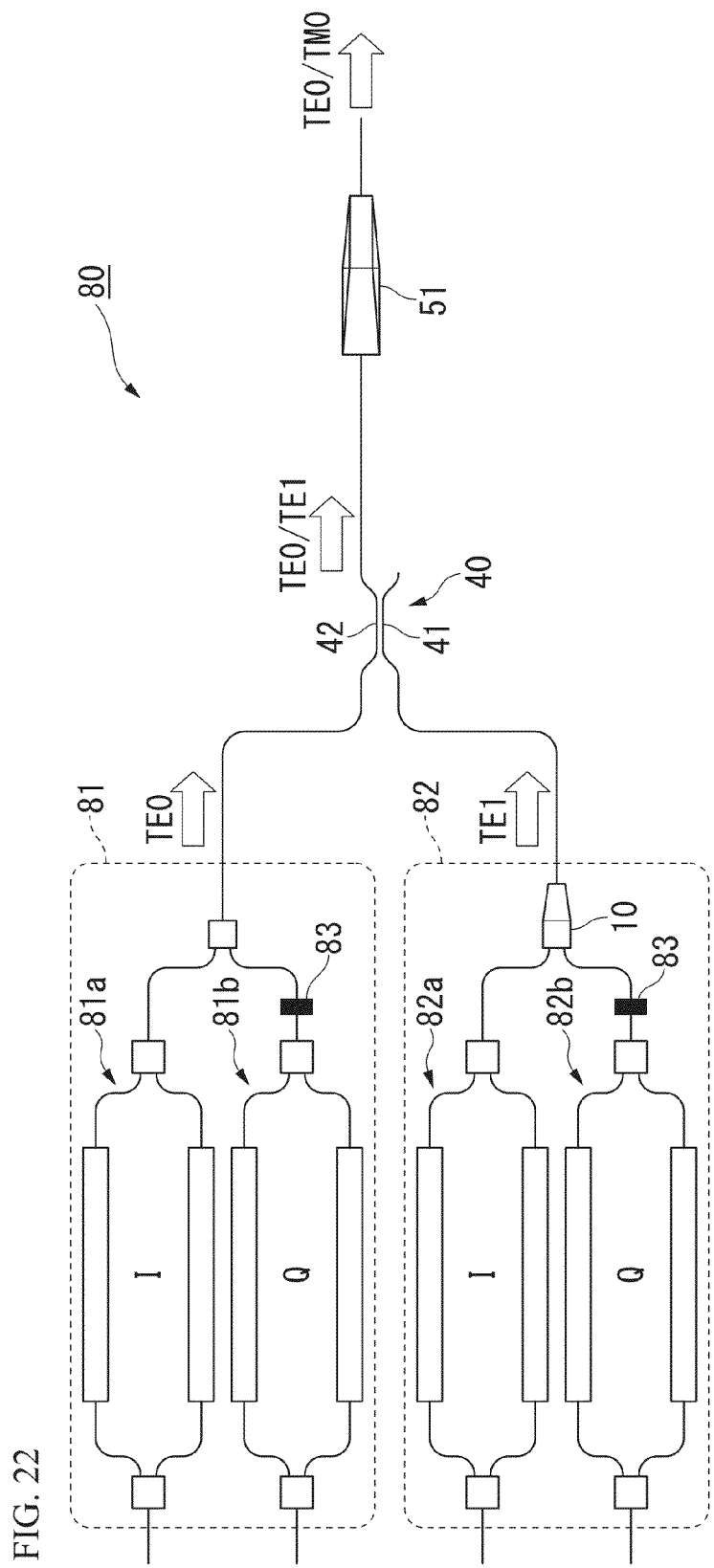
FIG. 22 is a schematic plan view showing a DP-QPSK modulator of a sixth embodiment.

A DP-QPSK modulator using the second embodiment can also be manufactured. In a DP-QPSK modulator 80 shown in FIG. 22, a QPSK modulator 81 includes two MZ interferometers 81a and 81b and a phase adjusting portion 83, a QPSK modulator 82 includes two MZ interferometers 82a and 82b and a phase adjusting portion 83, and the high-order mode conversion combining element 10 is provided as a combining portion of the QPSK modulator 82. In this point, the sixth embodiment is the same as the fifth embodiment. However, the present embodiment is different from the fifth embodiment in that the high-order mode splitter 40 is provided instead of the polarization beam splitter 60 and the high-order polarization conversion element 51 is provided after the high-order mode splitter 40 instead of being provided before the polarization beam splitter 60.

According to the DP-QPSK modulator 80 of the present embodiment, TE1 generated by the high-order mode conversion combining element 10 is extracted by the high-order mode splitter 40 and is multiplexed with TE0, which is an output of one QPSK modulator 81, and a multiplexed output (TE0/TM0) of the fundamental TE mode and TM0 is finally obtained by using the high-order polarization conversion element 51 connected after the high-order mode splitter 40. As in the fifth embodiment, in the present embodiment, two signals input to the high-order mode conversion combining element 10 can be adjusted so that the phase difference becomes $\pi/2$ by the phase adjusting portion 83 of the QPSK modulator provided before the high-order mode conversion combining element 10. Therefore, the DP-QPSK modulator 80 can be used as in the use example 2 of the first embodiment. In addition, the method of modulating TE0 is not limited to QPSK. Even if a modulator having a simpler configuration or a modulator having a complicated configuration is used, it is possible to perform polarization multiplexing using the high-order mode conversion combining element of the embodiment described above.

Seventh Embodiment

DP-QPSK Modulator: Case 3

Figure 23:
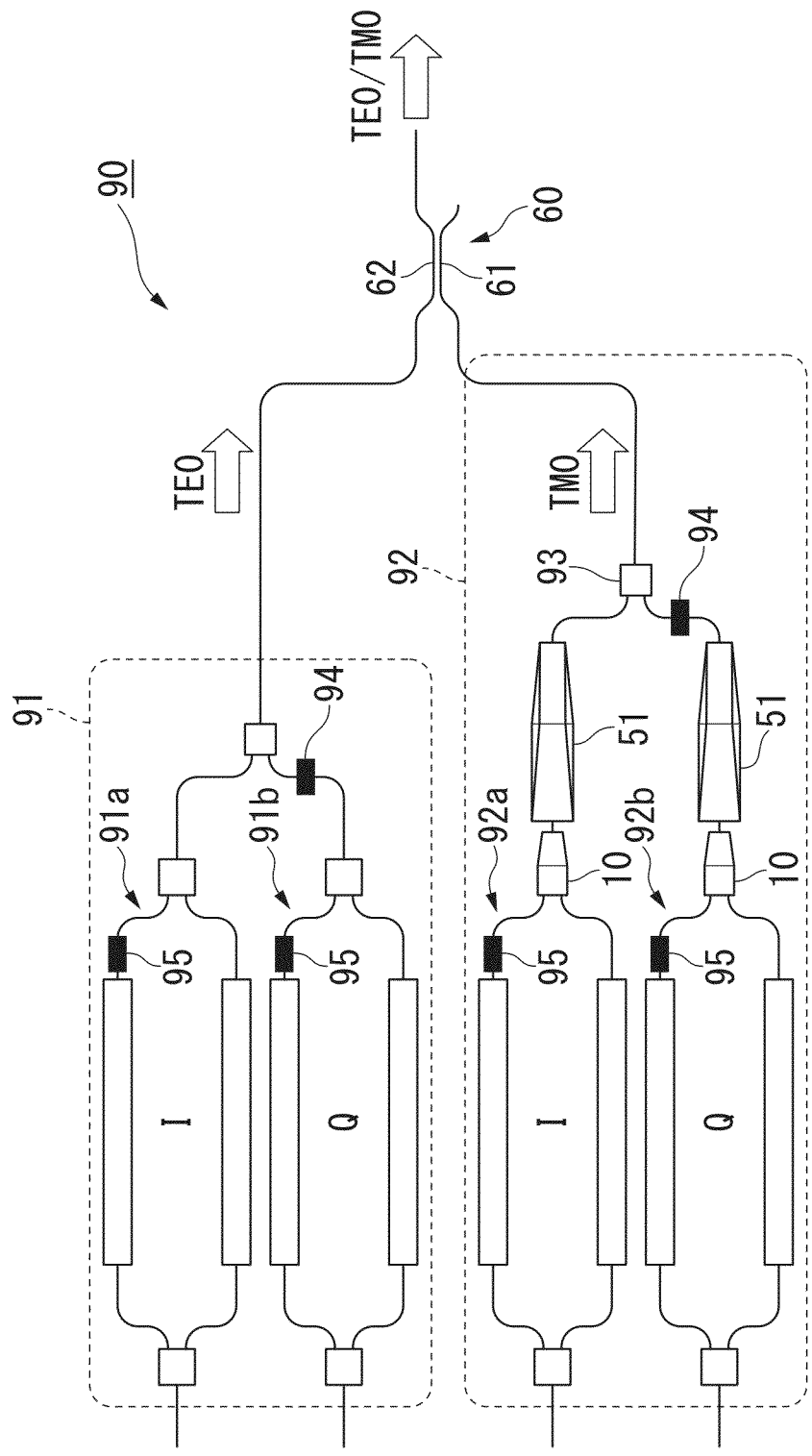
FIG. 23 is a schematic plan view showing a DP-QPSK modulator of a seventh embodiment.
Figure 24A:
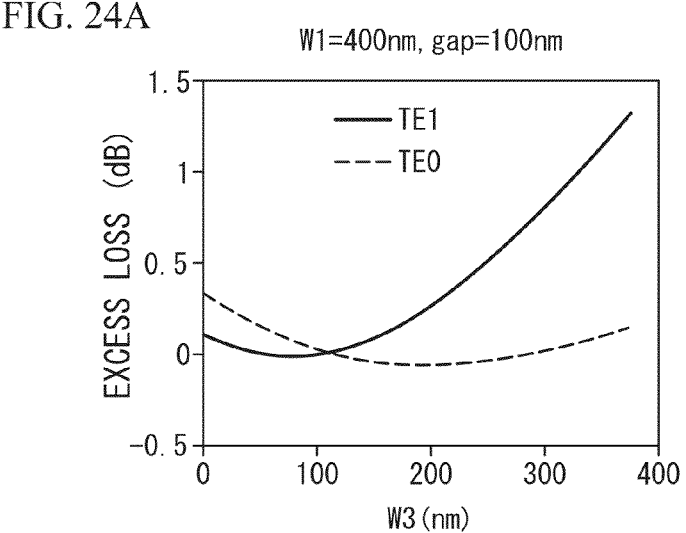
FIG. 24A is a graph showing a simulation result (gap=100 nm) of the relationship between the width W3 of a protruding portion and the excess loss when W1=400 nm in Example 1.
Figure 24B:
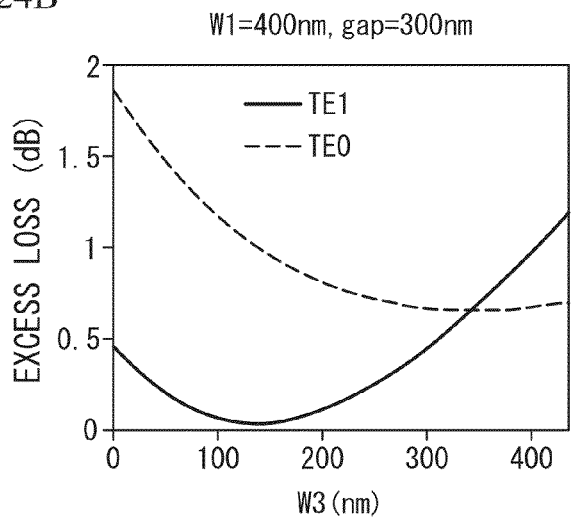
FIG. 24B is a graph showing a simulation result (gap=300 nm) of the relationship between the width W3 of a protruding portion and the excess loss when W1=400 nm in Example 1.
Figure 24C:
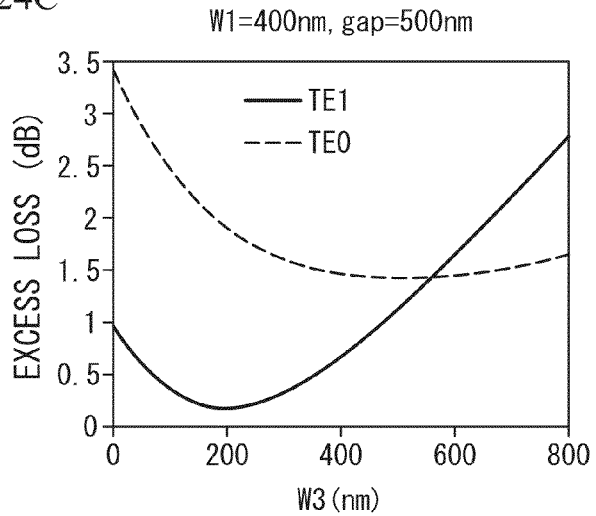
FIG. 24C is a graph showing a simulation result (gap=500 nm) of the relationship between the width W3 of a protruding portion and the excess loss when W1=400 nm in Example 1.
Figure 25A:
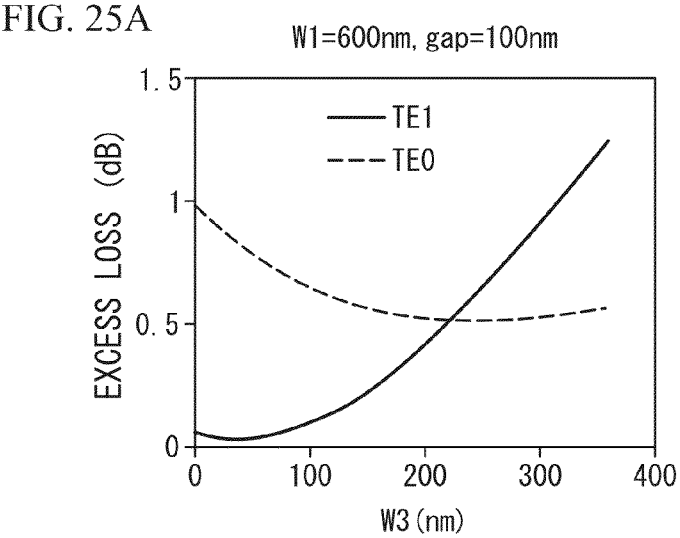
FIG. 25A is a graph showing a simulation result (gap=100 nm) of the relationship between the width W3 of a protruding portion and the excess loss when W1=600 nm in Example 1.
Figure 25B:
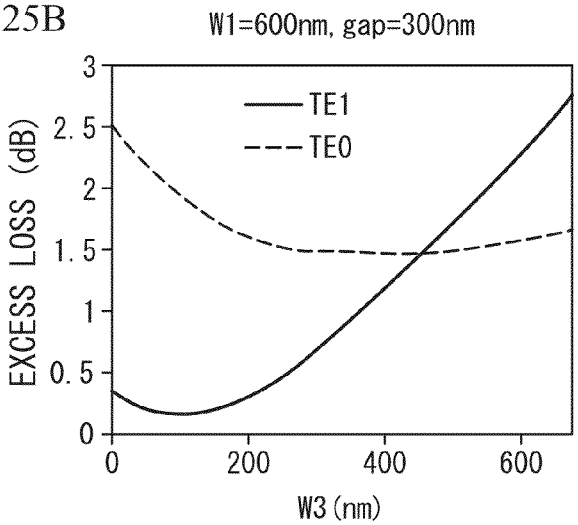
FIG. 25B is a graph showing a simulation result (gap=300 nm) of the relationship between the width W3 of a protruding portion and the excess loss when W1=600 nm in Example 1.
Figure 25C:
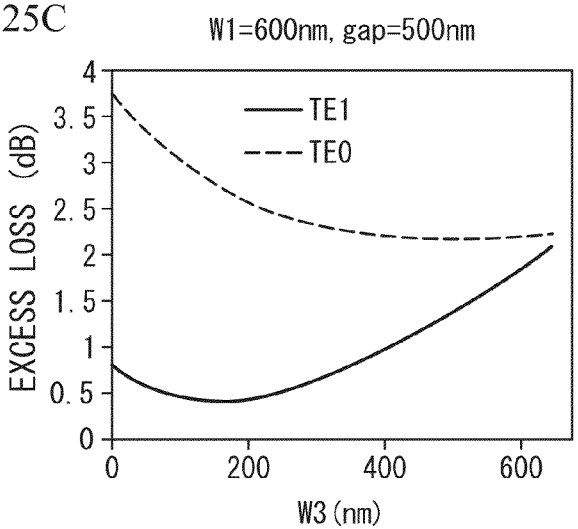
FIG. 25C is a graph showing a simulation result (gap=500 nm) of the relationship between the width W3 of a protruding portion and the excess loss when W1=600 nm in Example 1.
Figure 26A:
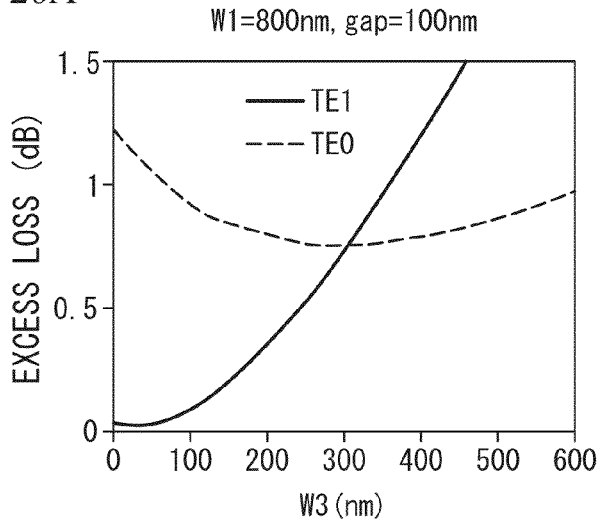
FIG. 26A is a graph showing a simulation result (gap=100 nm) of the relationship between the width W3 of a protruding portion and the excess loss when W1=800 nm in Example 1.
Figure 26B:
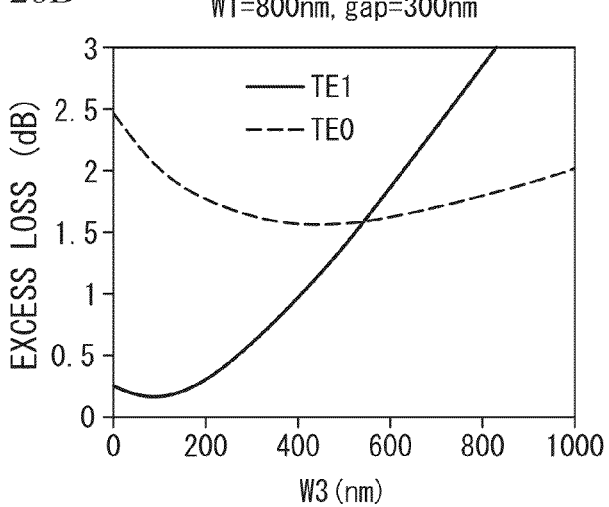
FIG. 26B is a graph showing a simulation result (gap=300 nm) of the relationship between the width W3 of a protruding portion and the excess loss when W1=800 nm in Example 1.
Figure 26C:
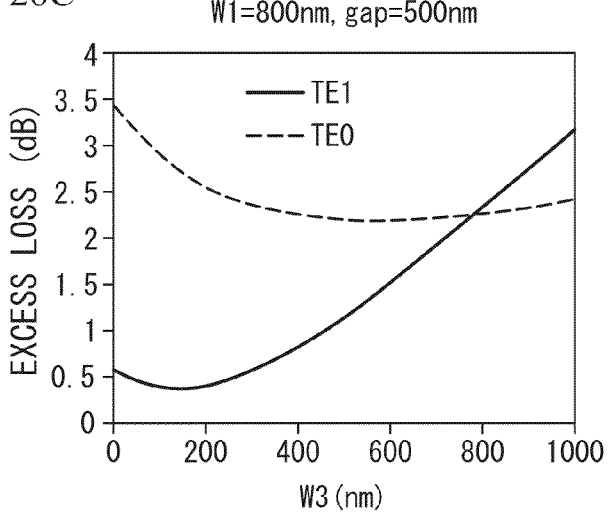
FIG. 26C is a graph showing a simulation result (gap=500 nm) of the relationship between the width W3 of a protruding portion and the excess loss when W1=800 nm in Example 1.

ADP-QPSK modulator using a combination of the third embodiment and a polarization beam splitter can also be manufactured. As shown in FIG. 23, in one QPSK modulator 92a of a DP-QPSK modulator 90 of the present embodiment, the high-order mode conversion combining element 10 is used in a combining portion of MZ interferometers 92a and 92b. In addition, a combining portion 93 for a fundamental TM mode is used as a combining portion of the I and Q signals. The present invention is the same as the fifth and sixth embodiments in that each of the QPSK modulator 91 and 92 includes a phase adjusting portion 94 that performs adjustment so that the phase difference between the I and Q signals becomes $\pi/2$.

In general, a mechanism for adjusting the phase difference between two waveguides before combining is provided in the MZ interferometer used as a QPSK modulator. In FIG. 23, a phase adjusting portion 95 is shown for each of the MZ interferometer 91a, 91b, 92a, and 92b. Therefore, since TE0 is not mixed with the output TE1 by setting the phase difference of TE0 input to the high-order mode conversion combining element 10 to π, it is possible to realize a high polarization extinction ratio (however, since the phase difference π cannot be maintained between transitions of modulated signals, TE0 is mixed with the output). TE1 output from the high-order mode conversion combining element 10 is converted to TM0 by the high-order polarization conversion element 51 connected after the high-order mode conversion combining element 10, and the I and Q signals are multiplexed by the combining portion 93. Then, as in the fifth embodiment, TM0 output from the QPSK modulator 92 is extracted from the waveguide 61 to the waveguide 62 by the polarization beam splitter 60 and is polarization-multiplexed with TE0 output from the other QPSK modulator 91. In addition, the method of modulating TE0 is not limited to QPSK. Even if a modulator having a simpler configuration or a modulator having a more complicated configuration is used, it is possible to perform polarization multiplexing using the high-order mode conversion combining element of the invention.

While the invention has been described based on preferred embodiments, the invention is not limited to the above embodiments, and various modifications can be made without departing from the scope of the invention.

The bent waveguide is not limited to being located before the input portion of the high-order mode conversion combining element. The bent waveguide may be connected after the output portion, or the bent waveguide may be provided anywhere.

Figure 15:
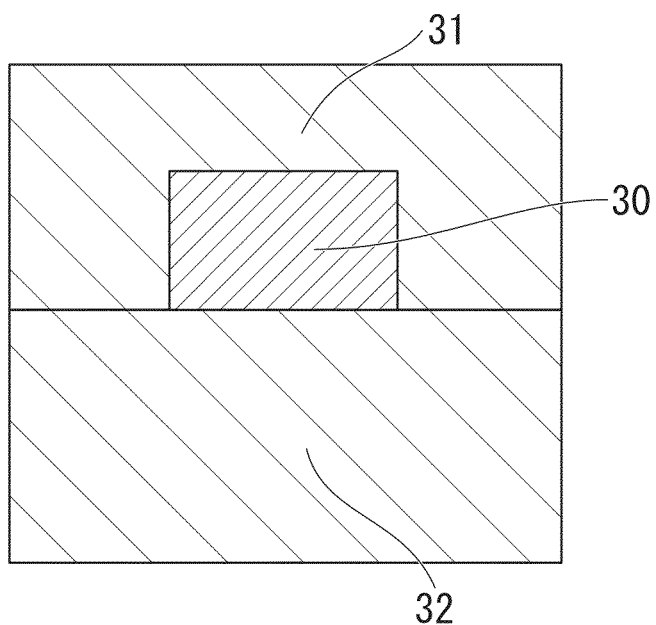
FIG. 15 is a cross-sectional view showing an example of a waveguide.

The waveguide that forms each portion (an input portion, a wide portion, a tapered portion, and an output portion) of the high-order mode conversion combining element preferably has a structure in which the cladding surrounds the core. As shown in FIG. 15, the cladding may have a structure including a lower cladding 32 provided on the lower side (substrate side) of a core 30 and an upper cladding 31 provided on the upper side of the core 30 and both sides in the width direction of the core 30. In this case, a waveguide can be formed by the procedure of forming the core 30 after laminating the lower cladding 32 from the substrate side and depositing the upper cladding 31. In a waveguide having a rectangular core cross-section, when a cladding surrounding the core is formed of the same material, the refractive index distribution of the cross-section is symmetric vertically and horizontally. Therefore, it is possible to suppress unintended polarization conversion even if a tapered portion is provided. For example, when $SiO_2$ is used as a material of the lower cladding 32, it is preferable to use $SiO_2$ for the upper cladding 31. When depositing $SiO_2$ for the upper cladding, intended impurities (dopant) or inevitable impurities may be included. When the core 30 is formed of Si and the lower cladding 32 is formed of $SiO_2$, it is possible to form a waveguide by using silicon on insulator (SOI) as a material. If group IV semiconductors, such as Si, Ge, and SiGe, and compounds, such as $SiO_2$ and $Si_3N_4$, are used as materials for forming the core and the cladding, an optical waveguide device can be manufactured by using the same apparatus and the same process as when manufacturing a semiconductor device, such as silicon, which is preferable.

A tapered waveguide for changing the width of a waveguide may be provided before the two input portions of the high-order mode conversion combining element. The tapered waveguide may be a waveguide having a width that decreases gradually toward the input portion, or may be a waveguide having a width that increases gradually toward the input portion.

The tapered waveguide for changing the width of the waveguide may also be provided after the output portion of the high-order mode conversion combining element. The tapered waveguide may be a waveguide having a width that decreases gradually from the output portion, or may be a waveguide having a width that increases gradually from the output portion.

As the modulation scheme of the modulator, amplitude shift keying (ASK), frequency shift keying (FSK), phase shift keying (PSK), and the like can be mentioned. As the PSK, binary phase shift keying (BPSK), 8-phase shift keying (8PSK), Offset QPSK (OQPSK), and the like can be mentioned without being limited to the QPSK described above.

EXAMPLES

Hereinafter, the invention will be specifically described by way of examples.

Example 1

High-Order Mode Conversion Combining Element

As a basic example, a high-order mode conversion combining element for which design parameters are selected so that the excess loss is reduced based on FIG. 14 can be mentioned. The high-order mode conversion combining element of this example is formed based on a silicon on insulator (SOI) substrate formed of Si—$SiO_2$—Si. In the SOI substrate, an intermediate $SiO_2$ layer is used as a lower cladding, and an upper Si layer is used as a core. After forming the core, the $SiO_2$ layer is provided as an upper cladding. FIG. 15 shows a cross-sectional view of the waveguide at this time. The cross-section indicates a plane perpendicular to the traveling direction of light.

The high-order mode conversion combining element of this example is formed by the waveguide that has a high refractive index difference by using Si for the core 30 and $SiO_2$ for the upper cladding 31 and the lower cladding 32 as described above. Therefore, since the light is strongly confined to the core, it is possible to manufacture the small high-order mode conversion combining element.

FIGS. 24A to 26C show the graphs of the relationship between W3 (nm) and the excess loss (dB) of TE1 and TE0 when performing a simulation calculation using a finite element method by setting typical values for the parameters shown in FIG. 5. In this example, the height of the core is set to 220 nm, and the wavelength is set to 1550 nm. The values of W1 (nm) and gap (nm) as representative parameters used herein are written in the following Table 1. In Table 1, in each condition, the value (W3 min) of W3 at which the excess loss of TE1 is minimized and the value (W3max) of W3, which is not 0 and at which the same excess loss as when W3=0 nm occurs, are written together.

TABLE 1

| W1 (nm) | gap (nm) | W3min (nm) | W3max (nm) |
|---|---|---|---|
| 400 | 100 | 80 | 161 |
| 400 | 300 | 142 | 285 |
| 400 | 500 | 198 | 395 |

TABLE 1-continued

| W1 (nm) | gap (nm) | W3min (nm) | W3max (nm) |
|---------|----------|------------|------------|
| 600 | 100 | 39 | 77 |
| 600 | 300 | 103 | 205 |
| 600 | 500 | 167 | 333 |
| 800 | 100 | 29 | 58 |
| 800 | 300 | 89 | 178 |
| 800 | 500 | 153 | 306 |

W3max is calculated from the following Formula (2) in a range of 400 nm≤W1≤800 nm and 100 nm≤gap≤500 nm. In Formula (2), when W1 and gap are substituted as values of nanometer units, the value of W3max is given as a value of nanometer units.

$$W3\text{max}=(-0.0000000008350862\times \text{gap}^2- 0.000000436986\times \text{gap}+0.0008631515625)\times W1^2+ (0.0000016652002737\times \text{gap}^2+0.000208004578\times \text{gap}-1.2672957688375)\times W1+(- 0.00069425946204\times \text{gap}^2+0.670233759496504\times \text{gap}+462.994458236249) \quad (2)$$

In the above range of W1 and gap, a range (0<W3<W3max) having a large effect of the invention can be determined from Formula (2). In this example, the result of Formula (2) is obtained by illustrating the case where the height of the core is 220 nm, the core is formed of Si, and the cladding is formed of $SiO_2$. However, when the height or the material of the core is different, an appropriate range can be calculated using the same method.

In addition, assuming that the width of the input portion is Wa (nm), the waveguide width of the wide portion is Wb (nm), and the width of the protruding portion is Wc (nm), these are expressed as follows corresponding to the parameters shown in FIG. 5.

$$Wa=W1,$$

$$Wb=W2+W3\times 2=\text{gap}+(W1+W3)\times 2,$$

$$Wc=W3=(Wb-(Wa\times 2+\text{gap}))/2$$

Figure 27:
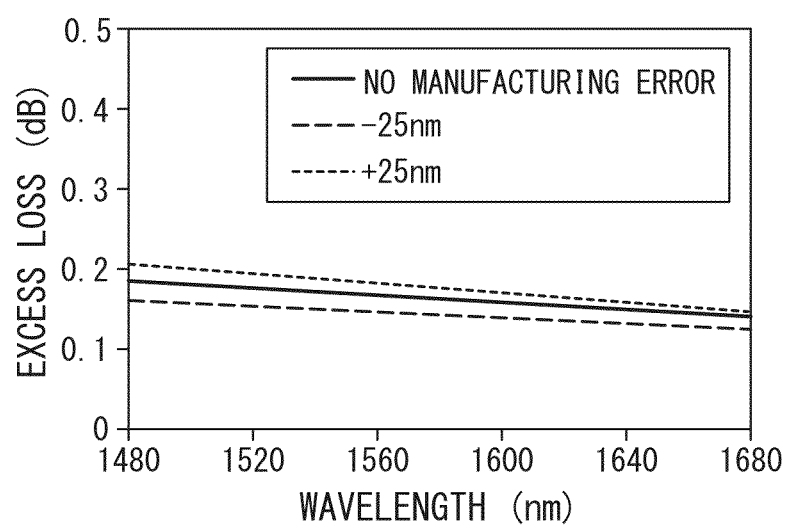
FIG. 27 is a graph showing an example of the wavelength dependence of excess loss in Example 1.

FIG. 27 shows the wavelength dependence of the excess loss of the high-order mode conversion combining element of this example. FIG. 27 also shows the wavelength dependence under the influence due to manufacturing error. For the manufacturing error, a case is assumed in which the waveguide widths of all waveguides forming the high-order mode conversion combining element of this example have been changed uniformly by "+25 nm" or "−25 nm" from the design values. Parameters used for the calculation of the case of "no manufacturing error" shown in FIG. 27 are W1=600 nm, gap=300 nm, and W3=103 nm, and the height of the core is 220 nm. As the case of "+25 nm" or "−25 nm" shown in FIG. 27, even if a manufacturing error is taken into consideration, it can be seen that the low excess loss of approximately 0.2 dB or less occurs in a wide wavelength range having a bandwidth of 200 nm.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A planar optical waveguide device, comprising:
   two input portions that are waveguides that have the same width, are parallel to each other, and have rectangular cross-sections;
   a wide portion that is a linear waveguide and is connected after the two input portions;
   a tapered portion that is connected after the wide portion and that is a multi-mode waveguide which has a tapered shape having a width decreasing gradually and through which at least TE1 propagates; and
   an output portion that is connected after the tapered portion and that is a multi-mode waveguide which has a rectangular cross-section and through which at least TE1 propagates,
   wherein the planar optical waveguide device forms a high-order mode conversion combining element that outputs the TE0, which is input to the two input portions, as the TE1 from the output portion, and
   assuming that a distance between the two input portions in a width direction of the two input portions is gap, a width of each of the two input portions is Wa, and a waveguide width of the wide portion is Wb, a relationship of Wb>Wa×2+gap is satisfied, and a center of the two input portions in the width direction matches a center of the wide portion in the width direction.

2. The planar optical waveguide device according to claim 1, further comprising:
   a bent waveguide that is connected before one or both of the two input portions.

3. The planar optical waveguide device according to claim 1, further comprising:
   a tapered waveguide that is connected before the two input portions and changes a width of a waveguide.

4. The planar optical waveguide device according to claim 1, further comprising:
   a tapered waveguide that is connected after the output portion and changes a width of a waveguide.

5. The planar optical waveguide device according to claim 1, further comprising:
   a high-order mode splitter that is connected after the output portion and extracts TE1.

6. The planar optical waveguide device according to claim 5, further comprising:
   a high-order polarization conversion element that is connected after the high-order mode splitter and converts TE1 to TM0.

7. The planar optical waveguide device according to claim 1, further comprising:
   a high-order polarization conversion element that is connected after the output portion and converts TE1 to TM0.

8. The planar optical waveguide device according to claim 7, further comprising:
   a polarization beam splitter that is connected after the high-order polarization conversion element and extracts TM0.

9. The planar optical waveguide device according to claim 1,
   wherein a waveguide that forms the high-order mode conversion combining element is formed by a core and claddings surrounding the core, and
   the claddings are formed of the same material.

10. The planar optical waveguide device according to claim 9,
    wherein, in a waveguide that forms the high-order mode conversion combining element, a height of the core is 220 nm, the core is formed of Si, the cladding is formed of $SiO_2$, and the Wa satisfies 400 nm≤Wa≤800 nm and the gap satisfies 100 nm≤gap≤500 nm, and assuming that Wc=(Wb−(Wa×2+gap))/2 and Wd=(−0.0000000008350862×$gap^2$−0.000000436986×gap+0.0008631515625)×$Wa^2$+(0.0000016652002737×$gap^2$+0.000208004578×gap−1.2672957688375)×Wa+(−0.00069425946204×$gap^2$+0.670233759496504×gap+462.994458236249), 0<Wc<Wd is satisfied.

11. A DP-QPSK modulator comprising the planar optical waveguide device according to claim 6.

12. A DP-QPSK modulator comprising the planar optical waveguide device according to claim 7.

13. A DP-QPSK modulator comprising the planar optical waveguide device according to claim 9.

14. A DP-QPSK modulator comprising the planar optical waveguide device according to claim 10.

* * * * *